(12) United States Patent
Harrison et al.

(10) Patent No.: US 7,036,161 B2
(45) Date of Patent: May 2, 2006

(54) COLLAPSIBLE STRUCTURES

(76) Inventors: Richard J. Harrison, 8 Spring Meadow La., Hockessin, DE (US) 19707; William F. Mann, 19 Healy Pl., Avondale, PA (US) 19311

( * ) Notice: Subject to any disclaimer, the term of this patent is extended or adjusted under 35 U.S.C. 154(b) by 66 days.

(21) Appl. No.: 10/075,862

(22) Filed: Feb. 13, 2002

(65) Prior Publication Data

US 2002/0070532 A1    Jun. 13, 2002

Related U.S. Application Data

(63) Continuation-in-part of application No. 09/642,948, filed on Aug. 22, 2000, now Pat. No. 6,428,033, which is a continuation-in-part of application No. 10/014,125, filed on Dec. 11, 2001, now Pat. No. 6,776,433.

(51) Int. Cl.
*A47D 13/06*    (2006.01)
*A47D 7/00*    (2006.01)

(52) U.S. Cl. .................................. 5/99.1; 5/95; 5/98.1

(58) Field of Classification Search .................. 5/99.1, 5/93.1, 98.1, 98.2, 93.2, 95
See application file for complete search history.

(56) References Cited

U.S. PATENT DOCUMENTS

| | | | |
|---|---|---|---|
| 2,927,331 A | 3/1960 | Ruiz | |
| 4,304,017 A | 12/1981 | Mortimer | |
| 5,172,435 A | 12/1992 | Griffen, et al. | |
| 5,290,050 A * | 3/1994 | Kim | ............................ 280/42 |
| 5,291,623 A | 3/1994 | Artz | |
| 5,517,707 A | 5/1996 | LaMantia | |
| 5,544,864 A | 8/1996 | Gabriel-Lacki et al. | |
| 5,970,539 A | 10/1999 | McDermott, Jr. et al. | |
| 5,984,406 A * | 11/1999 | Lee | ............................ 297/16.2 |
| 6,148,456 A | 11/2000 | Tharalson et al. | |
| 6,247,749 B1 * | 6/2001 | Yu | ............................ 297/16.2 |
| 6,276,548 B1 * | 8/2001 | Mitchell | ..................... 220/9.4 |
| 6,438,773 B1 | 8/2002 | Hsia | |
| 6,550,082 B1 | 4/2003 | Tharalson et al. | |

* cited by examiner

*Primary Examiner*—Alexander Grosz

(57) ABSTRACT

The present invention relates to collapsible self-supported cribs which have one or more of the following characteristics: adjustable length and/or, width and/or height, lightweight, easily collapsed, very compact when collapsed and easily carried, stored and transported. The cribs contain one or more of the following elements: anti-torque posts, crossed support arms, telescoping crossed support arms, flexible liners, Structure Locking Elements, Anti-Collapse Locking Elements and Anti-Tipping Assemblies.

10 Claims, 26 Drawing Sheets

COLLAPSIBLE STRUCTURES

CROSS REFERENCE TO RELATED APPLICATION

This application is a second Continuation-in-Part of parent U.S. patent application Ser. No. 09/642,948 filed on Aug. 22, 2000—now U.S. Pat. No. 6,428,033—and a first Continuation-in-Part U.S. patent application Ser. No. 10/014,125 filed on Dec. 11, 2001—now U.S. Pat. No. 6,776,433.

FIELD OF THE INVENTION

The present invention relates to collapsible self-supported structures. All of these structures have one or more of the following characteristics: adjustable length and/or, width and/or height, lightweight, easily collapsed, very compact when collapsed and easily carried, stored and transported. Embodiments disclosed relate to pens, cribs, play yards, bed rails, wheeled carts, animal crates with and without wheels and collapsible structures with ceilings or roofs such as play houses, tents and covers for objects such as pallets of cement.

BACKGROUND OF THE INVENTION

Folding Cart

The present invention enables us to fill the unmet needs for a diverse population of cart users. The uses for such carts are virtually endless ranging from transport of hospital food, medical supplies, medical instruments, patient belongings and other utensils, to carts used for mail delivery, catering, refuse removal, shopping, animal transport and many other home and business applications.

Carts used in these applications all generally have a problem with the amount of space required for storage or transport when the carts are not in use. To resolve that problem, some carts have been made to collapse or fold so that less space is required for storage. In general, most of these carts will fold in only one direction thus leaving a large essentially two-dimensional object for storage. In this specification, we will disclose a cart frame that collapses in two directions to create a very compact collapsed frame to solve this problem.

In general, carts are made to a specific size that cannot be alter once the cart has been manufactured. Thus, a user requiring a cart of two different dimensions must chose to use a cart which doesn't fit the application of have two different carts. In this specification, we will disclose a collapsible, adjustable cart frame that can be adjusted by the user prior to use.

Baby Beds, Cribs, Play Pens, Play Yards, Bed Rails, Etc

This invention relates generally to collapsible box shaped structures like baby beds and including devices that act as cribs, playpens or play yards and the like. It does, however, also relate to structures having a side and a bottom such as a bed rail.

Traveling or camping with babies and very young children is often very difficult because a large amount of equipment is necessary to provide for the baby or young child. While it is known that certain devices may be collapsed for easier transport, many of these devices are still relatively difficult to store in a relatively small space. In addition, many or these devices are heavy, making it difficult to carry all of the necessary items for supporting the baby or young child.

For example, while collapsible playpens or play yards are known, they generally include a relatively heavy frame connected by hinges. The frame may be collapsed with some effort, and it is still necessary to transport the relatively heavy device from place to place. Moreover, as the size of the child increases the size and weight of the devices to accommodate them also tends to significantly increase. For a family traveling or camping with a baby or young child, this may mean not only must they transport the youngster, the youngster's clothing and food, but the heavy bed and perhaps playpen must be moved as well.

Another limitation on existing cribs, playpens and play yards is the size of baby or child that can be accommodated by the devices. A full size baby crib would generally be considered much to big for a new born infant and a bassinet obviously would be to small for a one or two year old child. Thus the need to purchase several different beds and playpens to accommodate a child's early sleeping and play needs.

Thus, there is a continuing need for a baby and young child's bed and/or confined play area which may be readily transported from place to place which may be easily set up at a new location, and which adequately protects the baby or young child. More over, it would be most desirable if one device could provide sleeping and play needs for the early periods of a child's life.

Thus, there is a continuing need for a baby and young child's bed and/or confined play area which may be readily transported from place to place which may be easily set up at a new location, and which adequately protects the baby or young child. More over, it would be most desirable if one device could provide sleeping and play needs for the early periods of a child's life.

Bed rails are often used for adult beds to keep children who are to big for a crib from falling out of bed. Because the rails are long and bulky, they are generally difficult to store and transport as they do not collapse in more than one direction. It would be most desirable to have a bed rails that can be collapsed in more than one direction and can be easily stored or transported.

In this specification we disclose solutions to the aforementioned problems related to baby beds, cribs, play pens, play yards, bed rails, etc.

Collapsible Structures with Tops, Ceilings or Roofs

The following are a few examples of collapsible six-sided structures (bottom, top and four sides) whose usefulness would be substantially improved by creating a structure that is collapsible in all directions and thus is more compact than simply folding elements together.

Lightweight structures such as tents or rain flies often require the use of ropes to hold the tents in an upright position. The ropes which generally extend outward and downward from the tent's upper corners to a ground anchor somewhat distant from the tent often present a tripping hazard to people in the area and if the rope happens to be pulled from the ground may cause the tent or rain fly to collapse. It would be of significant help to have a rigid structure that does not require ropes to keep the structure in an upright position.

Another structure that could be improved with a frame that was collapsible in all directions is a children's playhouse. Most children's playhouses are constructed of solid sides and are generally not collapsible beyond taking the sides and roof apart. This makes the individual sides very bulky and causes significant difficulty in storing the entire structure. It would be of significant benefit if a playhouse that was easy to collapse in all directions such that the size of the storage area was significantly reduced and the easy of assembly and transport improved.

Another area of improvement is the protection of pallets of materials such as cement. Cement is very sensitive to moisture and is generally stored in a covered warehouse on pallets. When the pallets are taken to a construction site a covered storage area is generally not available so plastic tarps are used to try and protect the cement from the elements. The tarps are often blown off during storms and the cement is ruined. It would be most beneficial to have an easily removable collapsible structure that could be placed over the cement that would protect it from the elements.

Animal Crates (with and without Wheels)

Another embodiment of the invention relating to collapsible structures relates to crates. For purposes of discussion in this specification we have focused on animal crates, however, it is intended that the same embodiments will apply to any similar six-sided structure (top, bottom, and four sides) used as any type of crate, box or containment structure.

Crates currently used by animal owners are generally made of metal wire that has been welded to form an open mesh. The crates generally have five or six open wire mesh sides and a metal tray for a bottom. In general the crates are too heavy and awkward for a person to carry in an assembled form so it is necessary to take them apart and reassemble them at a new location. Because of the weight of some crates, it is often necessary to make several trips to move all of the crate parts when moving a crate. Moreover, the reassembly can be time consuming and frustrating.

An alternative method of moving the metal crates is to have a wheeled dolly upon which a crate can sit. The dolly also tends to heavy and difficult to handle. Thus it would be improvement to have a lightweight collapsible crate that can be easily carried and reassembled. Moreover, in cases where it is desirable to move an animal in the crate it would be desirable to have a crate on wheels.

In this specification we disclose a solutions that apply to collapsible structures such as animal crates and to crates in general.

SUMMARY OF THE INVENTION

In this specification we describe a number of possible collapsible structure configurations and applications. All of the collapsible structures contain one or more of the following elements: anti-torque posts, crossed support arms, telescoping crossed support arms detachable horizontal support bar assemblies, and telescoping horizontal support bar assemblies.

In the detailed description we describe how each of the aforementioned elements are constructed and operate in relation to structures that collapse in at least two directions simultaneously. We disclose collapsible structures with fixed dimensions when opened and those whose dimensions can be altered. We disclose collapsible structures with and without wheels. In the details we provide a number of specific application examples for the collapsible structures enumerated.

DETAILED DESCRIPTION OF PREFERRED EMBODIMENTS

Figure 1:
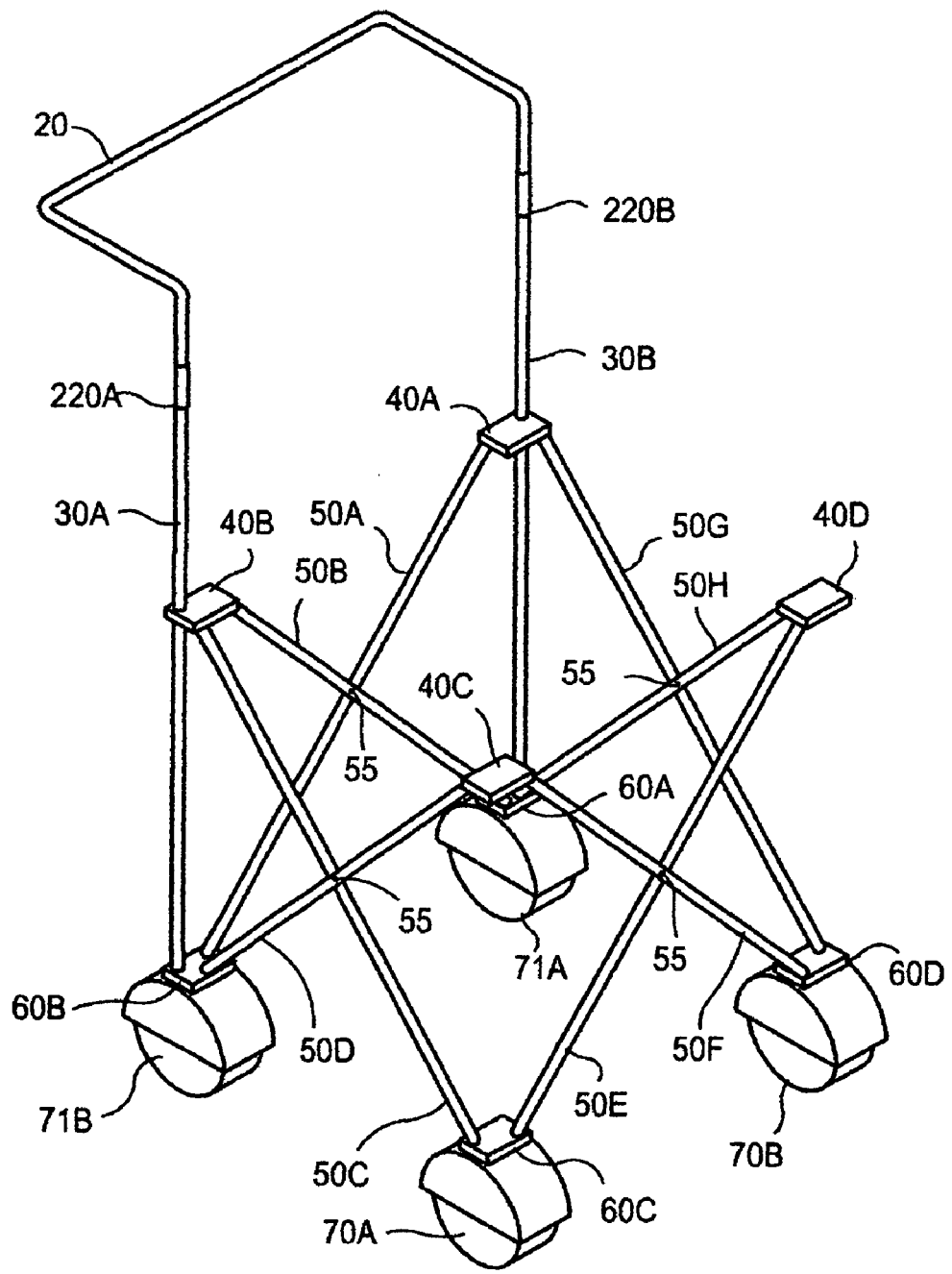
FIG. 1 is a perspective view of a basic collapsible four-sided cart frame.
2.

In this specification like reference characters are used for like parts throughout the several views and similar parts at different locations are indicated by a letter following the part reference number. Thus for example, referring to FIG. 1 (This figure is also FIG. 1 from the parent application Ser. No. 09/642,948 filed on Aug. 22, 2000—now U.S. Pat. No. 6,428,033—and hereafter referred to as "Parent") the four lower corner brackets 60A, 60B, 60C, and 60D may be referenced as individual brackets in this specification or when not referring to a specific bracket but rather the brackets in general as lower corner brackets 60. Also, in this specification the term "open" when used in connection with the description of a device is meant to mean the device in its functional or use configuration and "closed" is meant to mean the device in its collapsed or non-functional configuration.

Turning now to a discussion of the drawings. FIG. 1 illustrates a collapsible frame having two bisecting pivotally connected at 55 crossed support arms, 50A and 50B, 50C and 50D, 50E and 50F and 50G and 50H, per side with all crossed support arms being of equal length, four lower corner brackets, 60A, 60B, 60C and 60D, four upper corner brackets, 40A, 40B, 40C and 40D, to which said support arms 50 are attached as illustrated. Also illustrated are four casters, 70A, 70B, 71A and 71B, one attached below each of lower corner brackets, 60A, 60B, 60C and 60D. FIG. 1 also illustrates two vertical posts 30A and 30B with quick disconnects 220A and 220B for a push bar 20.

It is from this basic collapsible frame structure that a number of new cart embodiments are disclosed. Although we will disclose each of the new embodiments individually, it is our intent that the reader understand that many permutations and combinations of the new embodiments illustrated are possible.

Figure 2:
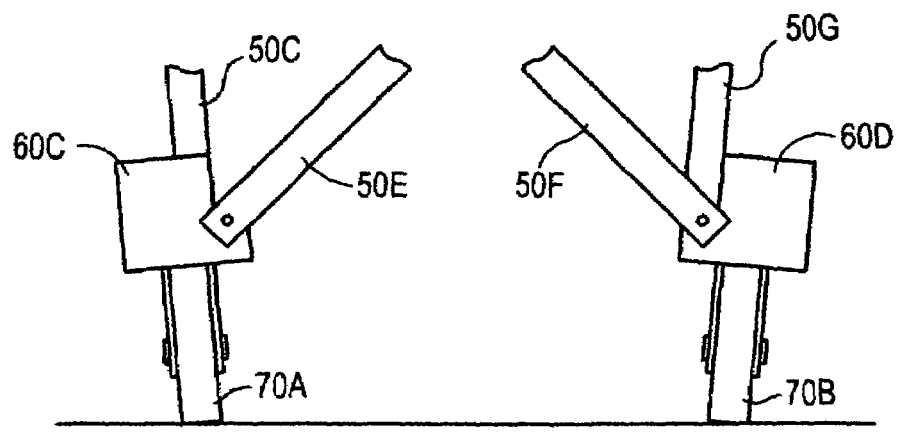
FIG. 2 illustrates the effect of a heavy weight applied to the cart frame without anti-torque posts.
3.

We have found that when heavy loads are applied to the frame illustrated in FIG. 1, the front upper corner brackets 40C and 40D, and the front lower corner brackets, 60C and 60D will tend to move out of vertical alignment. This is a problem since the wheels 70A and 70B, are mounted directly below the corner brackets 60C and 60D and are thus also forced out of vertical alignment and render the cart inoperative as illustrated in FIG. 2 (this figure is also FIG. 10A of the CIP of Parent filed Dec. 10, 2001 (hereafter referred to as CIP-1) with a slight modification—[footrest attachment brackets 133A and 133B removed])

Figure 3:
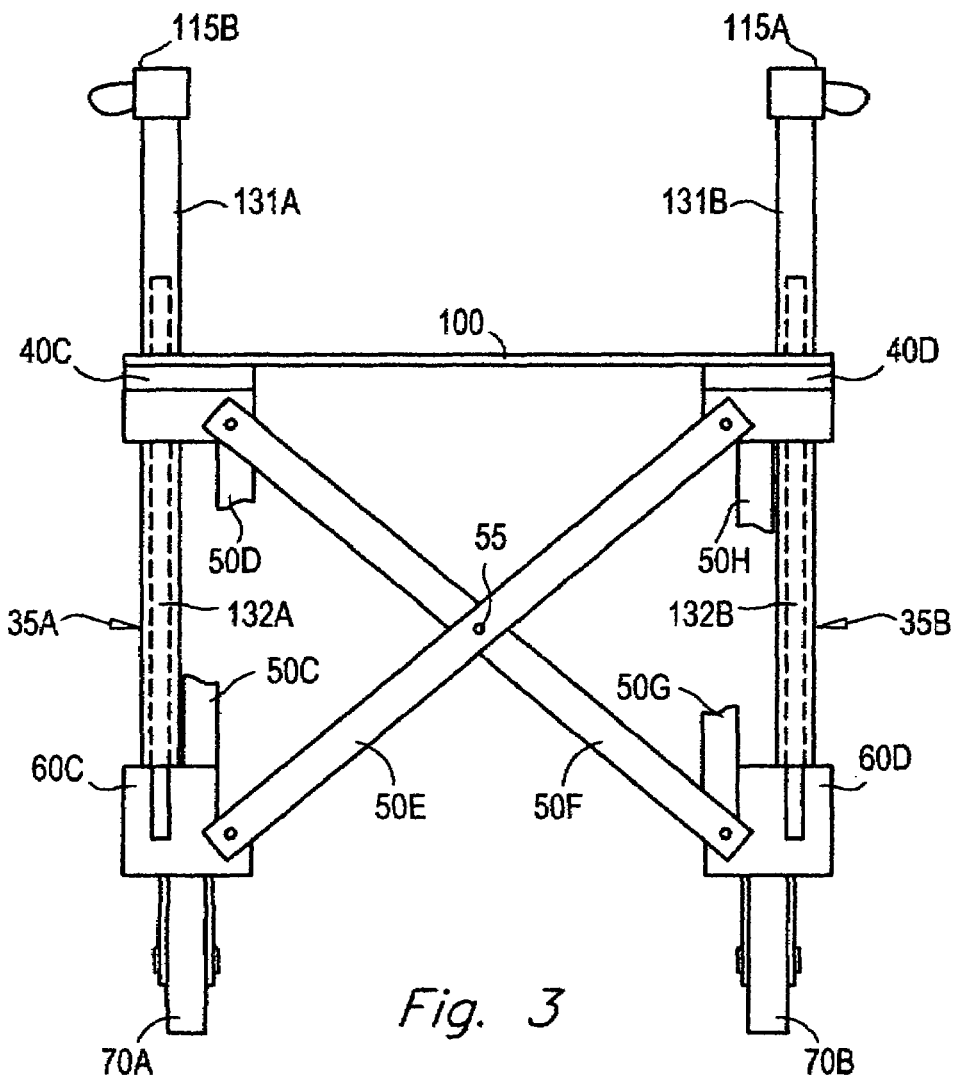
FIG. 3 is a cross sectional view of the front of a cart frame with anti-torque posts.
4.
Figures 4, 5:
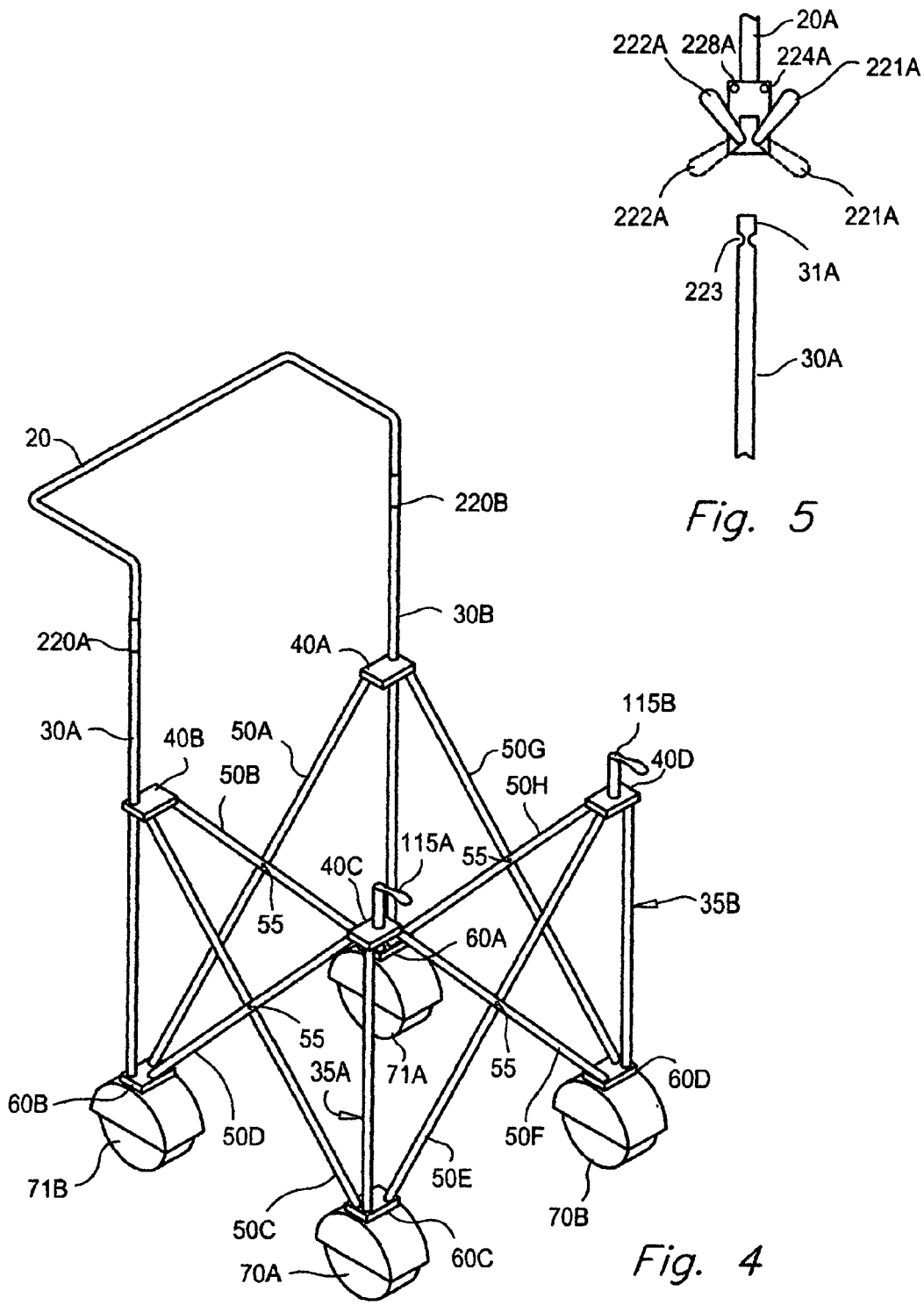
FIG. 4 is a perspective view of a collapsible four-sided cart frame with anti-torque posts.
5.
FIG. 5 illustrates the cam lock attachment of a push bar to a vertical post.
6.
Figure 10:
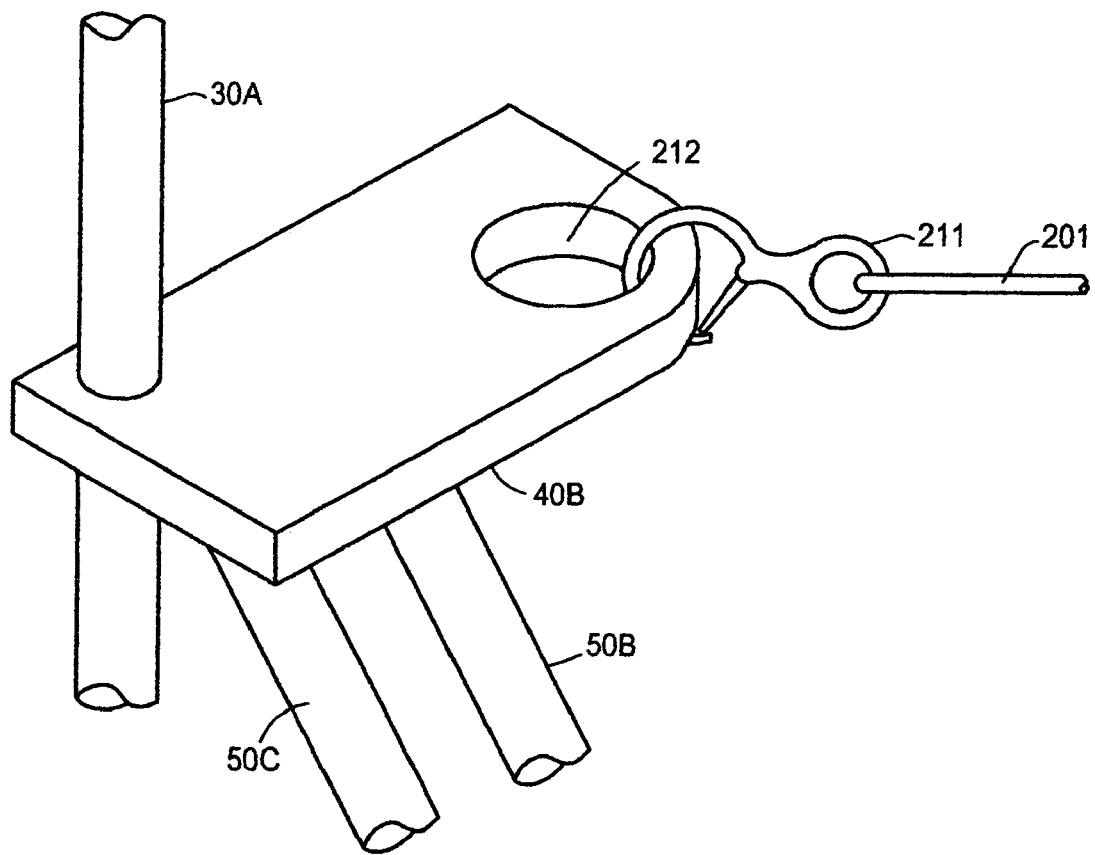
FIG. 10 illustrates a corner bracket modification to permit attachment of Structure Locking Elements from inside the collapsible frame structure.
11.
Figure 13:
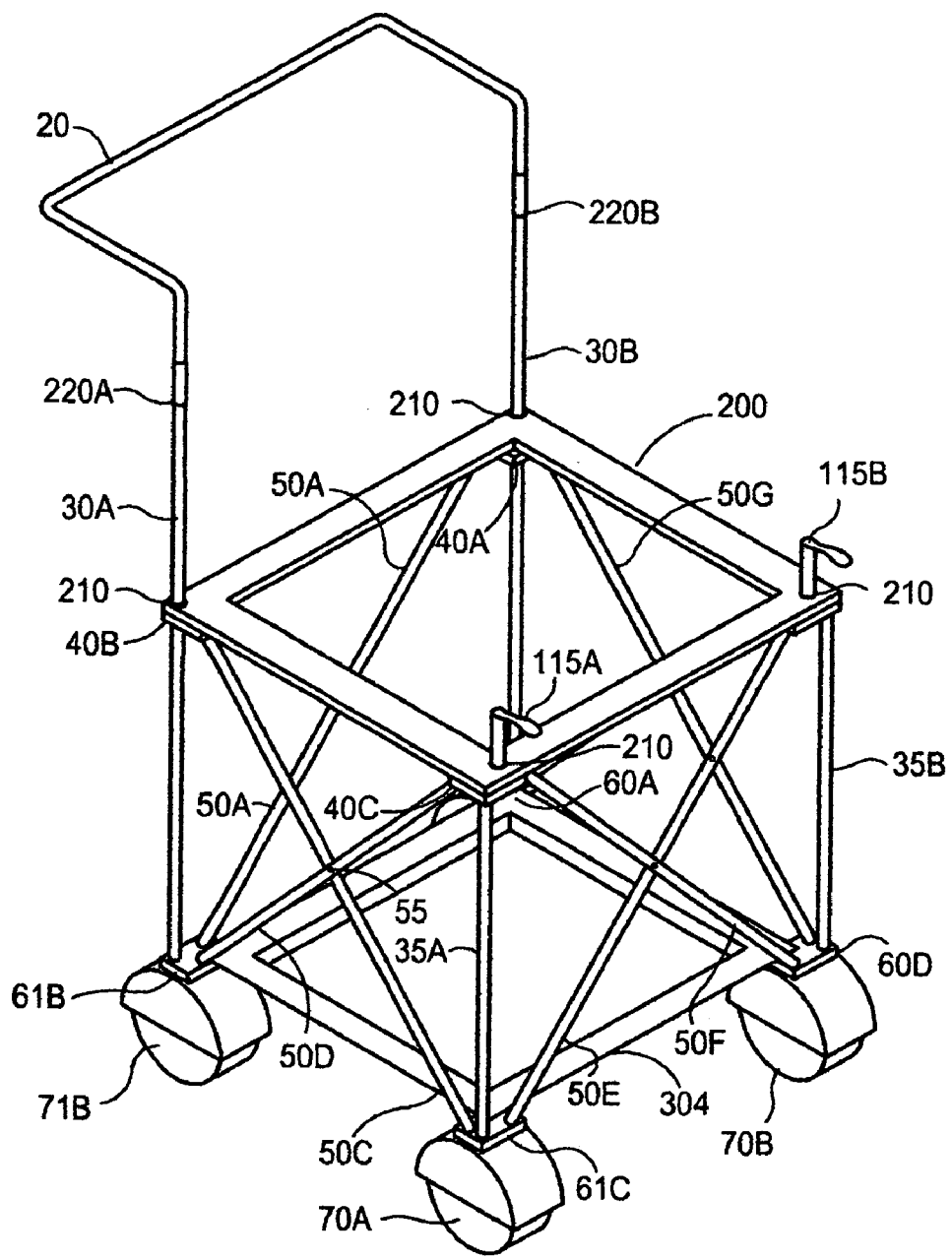
FIG. 13 illustrates a combination lower rigid Structure Locking Element and a flexible upper Structure Locking Element.
14.

The solution for this problem is the addition of telescoping anti-torque posts 35A and 35B, as shown In FIG. 3 (This figure is also FIG. 10 of the CIP-1 with a slight modification—[hand grips 57, seat 100, and arm rests 105 have been removed]). FIG. 3 is a front cross sectional view of the cart front illustrated in FIG. 4. (Note—similar telescoping anti-torque posts 35 are also illustrated in FIG. 13 of the CIP-1). FIG. 4 is identical to FIG. 1 with the exception of the addition of two telescoping anti-torque posts, 35A and 35B. In this embodiment as illustrated in FIG. 3, two telescoping vertically aligned anti-torque posts, 35A and 35B, are comprised of lower posts, 132A and 132B attached to the two lower front corner brackets 60C and 60D. A second set of hollow slidable posts 131A and 131B are positioned over lower posts 132A and 132B. In one version of the invention the upper ends of 132A and 132B are connected the upper front corner brackets 40C and 40D and in a preferred embodiment of the invention illustrated in FIG. 3, the upper posts 131A and 131B extend through the upper front corner brackets 40C and 40D and are slidable within those brackets.

Thus, the upper portion of the anti-torque posts, 131A and 131B, are slidable through upper front corner brackets, 40C and 40D, and telescopically slide over the lower posts, 132A and 132B, during folding and unfolding of the cart. In fact, posts 131A and 131B slide over smaller internal posts 132A and 132B thereby making it possible to fully collapse the cart frame.

The system shown in FIG. 3 solves the caster twisting technical problem by preventing such torque distortion. This is accomplished by adding vertical telescoping anti-torque posts assemblies 35A and 35B that keep the upper and lower front corner brackets 40C and 40D and 60C and 60D in vertical alignment. In turn, this is because the torque forces are less than the vertical force of anti-torque posts 35A and 35B. In essence, the anti-torque functionality of this invention is provided by telescoping front posts 35A and 35B.

As illustrated in FIG. 3, the lower end of posts, 131A and 131B, are supported by the lower front corner brackets 60C and 60D.

FIG. 3 and FIG. 4 illustrate cam lock connecters, 115A and 115B, attached to the upper ends of the telescoping anti-torque posts, 131A and 131B. These cam locking connecters, 115A and 115B, provide a means for locking a tray, basket, bag, web or other Structure Locking Element in place when the collapsible cart is in open and use position. In addition, the can lock connecters, 115 are used as a stopper mechanism to lift the upper end of the telescope the upper anti-torque posts, 131A and 131B when they come in contact with the upper corner brackets 40C and 40D as the cart is collapsed. The operation of the cam lock connecters is similar to that of the quick connect fittings 220 that will be described later.

Although cam lock connectors are used in FIG. 3 and FIG. 4 to lock the Structure Locking Element in place is used as illustrative of the function. Any attachment mechanism that can be easily removed and reinstalled can also serve the same function.

In a preferred embodiment of the invention, the lower sections 132A and 132B (see FIG. 3) of the telescoping anti-torque posts 35A and 35B have the smaller diameter and slide inside the larger diameter sections 131A and 131B that are on top. It is known, however, that the reverse orientation could have been applied. In addition, the inside posts may be of hollow or solid construction.

The length of the lower sections of the telescoping anti-torque posts, 132A and 132B, is such that these posts have a considerable overlap with the front upper sections of the anti-torque posts, 131A and 131B, when the device is in the collapsed position such that they will not be easily separated. Thus, a portion of the interior sections 132A and 132B are always contained within the upper outer sections 131A and 131B. For the first time in the art of cart design this telescoping system makes it possible to use a flexible or removable cart frame support structure and maintain the casters in alignment during use and still have a collapsible cart closing simultaneously in the X and Y direction.

The Parent application that focuses on a mobility device and chairs described elements 30A and 30B in FIG. 1 as vertical backrest posts to which a removable push bar 20 is mounted. The CIP-1 further defined the posts 30 and push bar 20 as having a quick connect means in order that they can be quickly connected and disconnected prior to the unfolding and folding operations. The CIP-1 further state that because the push bar 20 might be used to lift, tilt and push mobility device it must be strongly connected to the backrest posts 30. One means of achieving this attachment is to use a cam locking quick connect fittings 220 attached to the ends of the push bar 20 and to the upper ends of the vertical backrest posts 30A and 30B as illustrated in FIG. 5 (This is FIG. 13A from CIP-1 in a reverse position).

In FIG. 5, illustrates how the vertical post 30A is installed into the quick connect fitting attached to the ends of push bar 20 by rivet 228A. The vertical post end 31A is inserted into the quick connect fixture body 224A. The cam lock arms 221A and 222A are attached to the quick connect fixture body by pins 225 that allow the arms to rotate from a near downward pointing direction to a near upward pointing direction. As the cam lock arms 221A and 222A rotate upward frictional pressure is applied to the vertical post end 31A thus locking it in place. To remove the push bar the process is reversed. Groves 223 or similar detents may be incorporated into the vertical post end 21A at the point of intersection with the cam lock arms 221A and 222A to insure a non-slip fit. A similar action is preformed to lock vertical post 30B into its associated quick connect fixture.

Although the quick connect fitting illustrated in FIG. 5 is attached to the push bar 20, the reversing the mounting with the quick connect fixture attached to the rear vertical posts 30 is possible. We prefer mounting the quick connect fixture on the push bar, since all encumbrances to sliding "Structure Locking Elements" (to be described later) over the vertical post 30 are removed. Moreover, the quick connect fixture on the push bar 20 can be used to lock the "frame structure elements in a fixed position. In a number of embodiments to be described later this will be the preferable embodiment.

When used as a collapsible cart frame the rear vertical posts 30A and 30B in FIG. 1 are not required to function as backrest posts as described in the Parent and CIP-1. In a number of cart embodiments they do, however, maintain their functionality as the mounting point for a detachable push bar 20 or handles that can be used to push, pull, lift and tilt the collapsible cart frame when configured in an open position and as non telescoping ant-torque posts.

Figure 6:
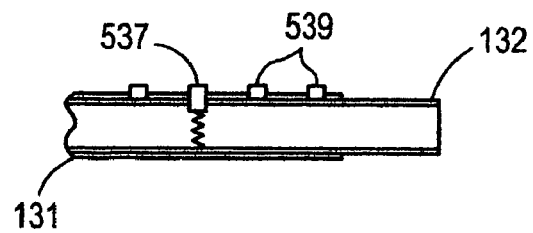
FIG. 6 illustrates a locking mechanism for two telescoping sections.
7.

In addition, the telescoping anti-torque posts 35 can be substituted for rear vertical posts 30A and 30B. This is desirable when the distance between the upper end of the vertical posts 30 and the upper rear corner bracket in the open position is less than the distance required for the end cap to travel when the cart fame is moved from an open to a closed position. When a telescoping anti-torque posts 35 are used as rear vertical posts it may also be desirable to provide a mechanism to lock the inner sections 132 and the outer sections 131 (FIG. 3) together so that attached handles or push bar can still be used to push, pull, lift or tilt the cart without separation of the telescoping anti-torque posts 35. FIG. 6 (CIP-1 FIG. 6A) illustrates one method of locking inner sections 132 and outer sections 131 together. In this illustration, outer section 131 has a number of holes 539 into which a push button locking and release clip 537 can be inserted to lock inner section 132 into a fixed position. The smaller inner section 132 has a spring action push button lock and release clip 537 mechanism mounted inside. Thus, when the push button locking and release clip 537 in the inner section 132 is lined up with a hole 539 in the outer section 131 the push button will move through hole 539 in the out section 131 and lock the sections together thereby preventing independent movement of one section.

It is also noted that a push bar can be connected to the end of the rear anti-torque posts 35 in a similar manner to that previously described for the rear vertical posts 30A and 30B.

Turning now to the Structure Locking Element embodiment that we will also refer to as SLE. For easy of understanding we have defined the SLE as the component element which when attached at or to the four upper corner brackets and/or at or to the four lower corner brackets holds the frame in a rigid fixed open position. The SLE keeps the frame in its desire upright position and prevents it from collapsing to the floor in the absence of a cross members such as the push bar 20 in FIG. 1.

SLEs can be of many shapes, sizes and materials and can be attached to or at the corner brackets in many ways. We will attempt to provide a number of general examples, however, these should not be considered as an all inclusive list, but rather only as examples of the embodiment.

Figure 7:
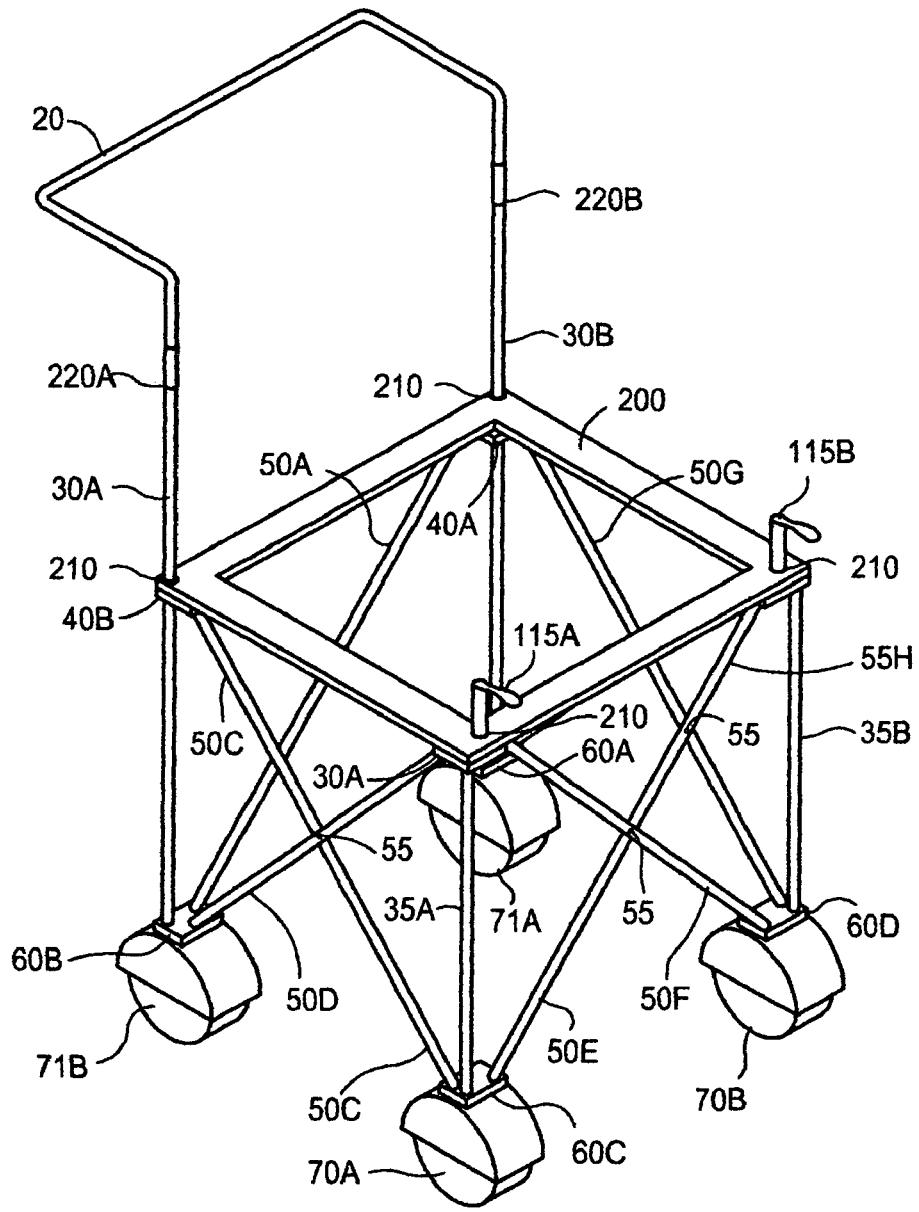
FIG. 7 illustrates a flexible Structure Locking Element attached by grommets to vertical posts passing through corner brackets.
8.
Figure 8:
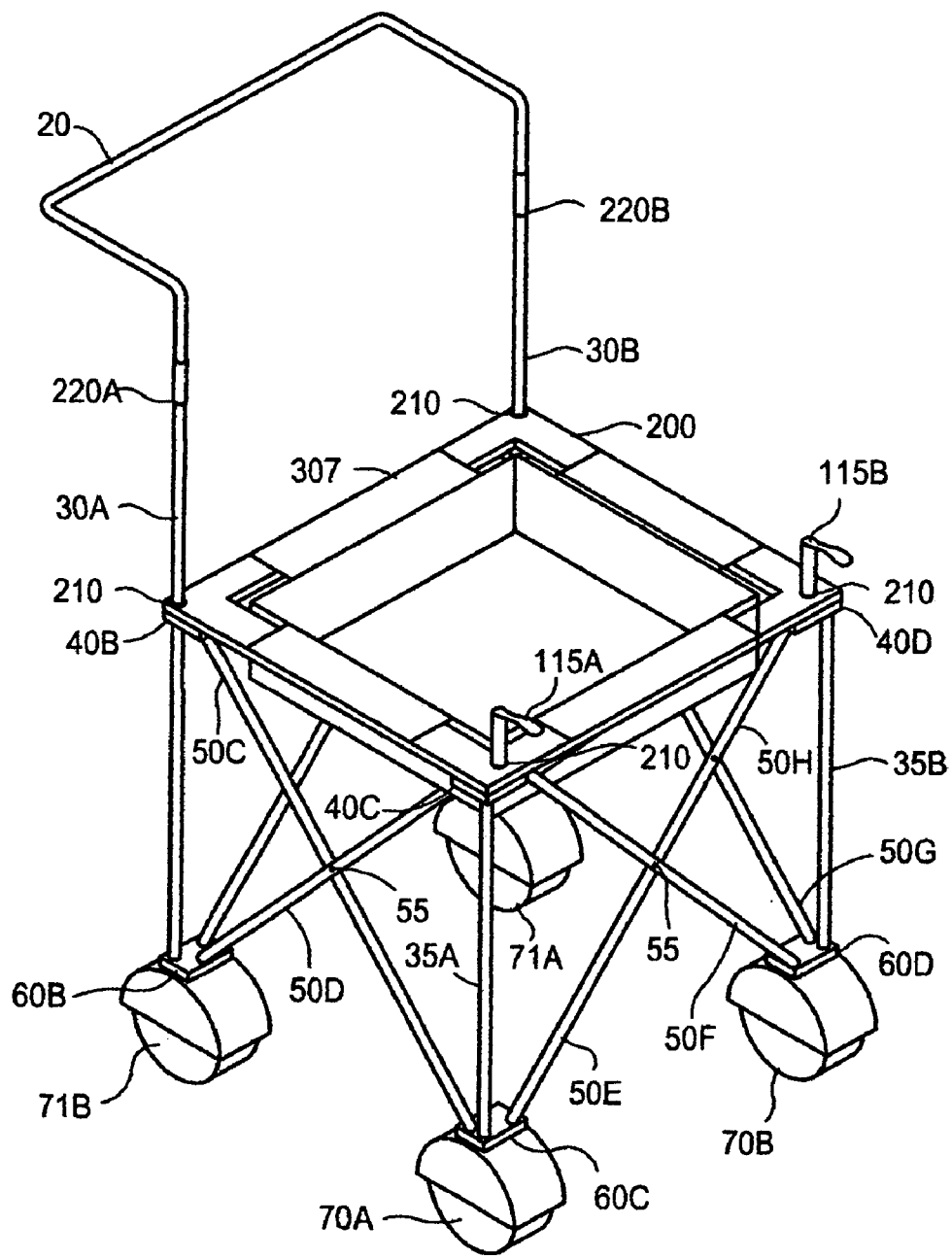
FIG. 8 illustrates a tray or basket mounted inside a flexible Structure Locking Element.
9.

Example 1: We start with a variation on a well known form of SLE, the seat for a camping chair. In this example we illustrate a SLE made of a flexible material such materials as webs, belts, fabric, rope, etc. FIG. 7, that is identical to FIG. 4 except for the addition of a flexible SLE 200 made of a nylon web, illustrates the corners of the SLE attached at the upper corner brackets 40A, 40B, 40C and 40D. In this example the SLE 200 is in the shape of a square because all of the crossed support arms are of equal length and thus by definition must form a square when open. In FIG. 7 we have illustrated grommets 210 placed in the four corners of the nylon web SLE 200 and the corner grommets 210 sliding over the rear vertical posts, 30A and 30B, and over the telescoping anti-torque posts, 35A and 35B. Thus the cart frame in FIG. 7 is held in a rigid fixed open position. This collapsible frame can then be converted into a useful cart for such purposes as hauling mail as illustrated in FIG. 8. This is accomplished with the addition of a removable basket or tray 307 having an upper rim that rests upon the SLE, 200.

At this point it is important to mention that although the SLEs 200 we discuss in this and the following examples are for carts having square openings in upper or lower corner brackets, the principles will also be applicable to rectangular frame embodiments that we will disclose later in the specification.

Example 2: Although this example uses a fabric web similar to that in Example 1, it differs significantly in that the SLE is offset inside the frame. This is very important when side walls are attached to the SLE since the offset prevents children and animals from striking or touching the collapsible frame when incorporated into play pens, cribs, and animal crates and carts.

Figure 9:
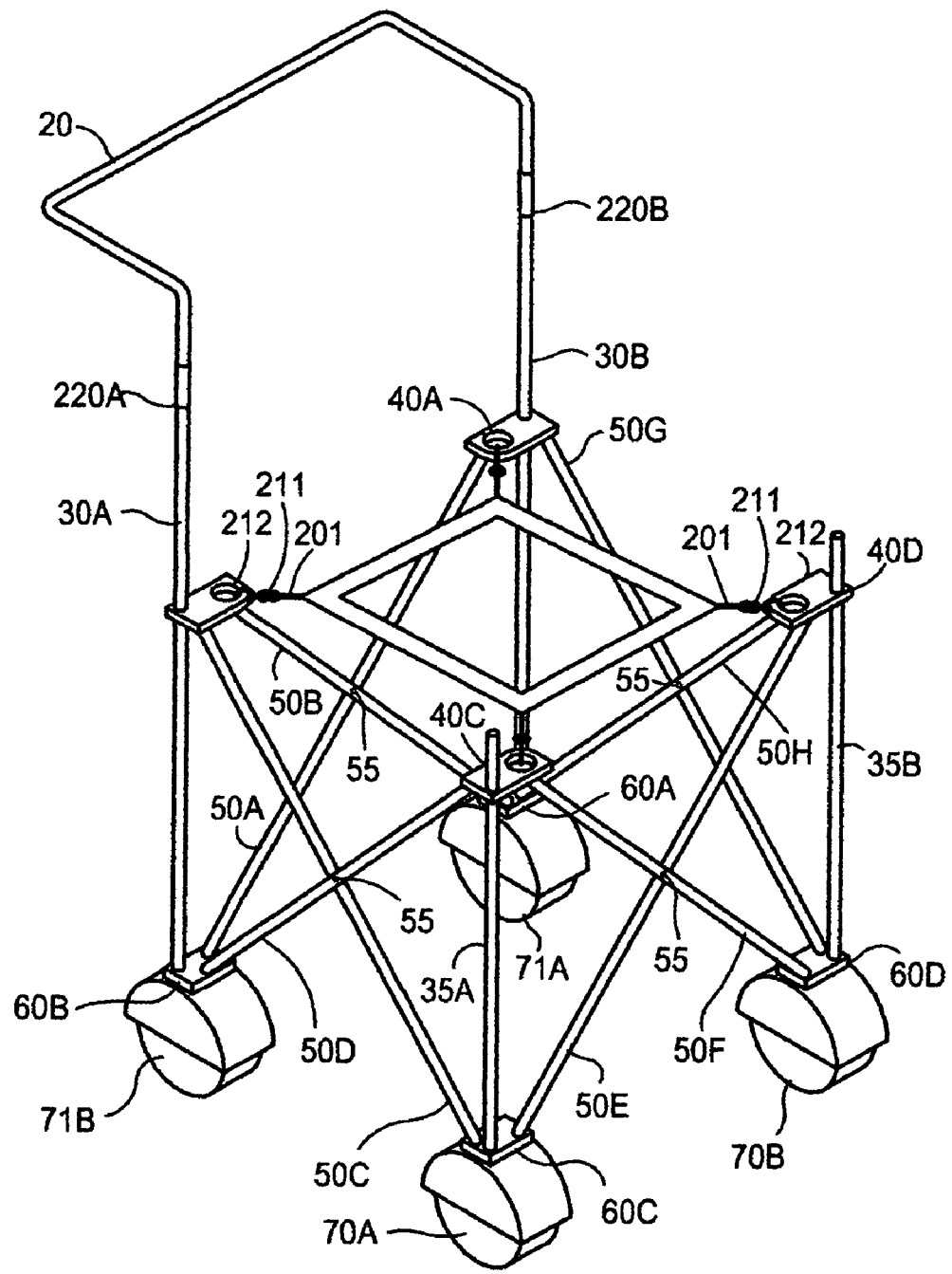
FIG. 9 illustrates a flexible Structure Locking Element attached by shackles to upper corner brackets.
10.

This new offset flexible SLE 202 is illustrated in FIG. 9. In FIG. 9 the flexible nylon web SLE 202 is attached to each of the upper corner brackets 40 by means of shackles 211. In this example, the upper corner brackets 40A, 40B, 40C and 40D have been modified as illustrated in FIG. 10, which is an enlarged view the area around the upper corner bracket 40B, so as to have a ring 212 upon which to clip the shackles 211. The shackles are attached to straps 201 which are attached to the outside corners of a flexible nylon web thus forming the SLE 202.

Example 3: This example relates to a new concept of using a rigid SLE for structure support and user functionality simultaneously. In this example the Rigid Structure Locking Elements can be made out of many materials such as metal, plastic and composites. In the example illustrated in FIG. 11, we use a plastic tray 301 to illustrate the concept. The plastic tray 301 is constructed such that it has four vertical hollow tubes 302 molded into its four corners. The diameter of the vertical hollow tubes 302 molded into the plastic tray 301 are such that they just slide over the vertical posts 30A and 30B and 35A and 35B extending above the upper corner brackets 40A, 40B, 40C and 40D thus locking the collapsible frame into a rigid configuration when the plastic tray 301 is installed on the frame. The rigid plastic tray 301 is attached to the frame by sliding the four hollow tubes 302 down over the vertical posts 30A and 30B and 35A and 35B. The tray is seated when the lower edge of the vertical hollow tubes 301 rest upon the top surface of the upper corner brackets 40. Thus, when the rigid SLE is placed on the cart frame posts, it becomes a usable tray on a functioning cart.

Previously it was noted that in some embodiments attaching the push bar quick connect locking mechanism to the push bar rather than the ends of the vertical posts 30 or 35 was advantageous with some embodiments of the SLE. This represents one of those embodiments where a quick connect locking mechanism 220 mounted on the push bar 20 can, if properly designed, can be used to lock the plastic tray 301 into its fixed position.

Figure 11:
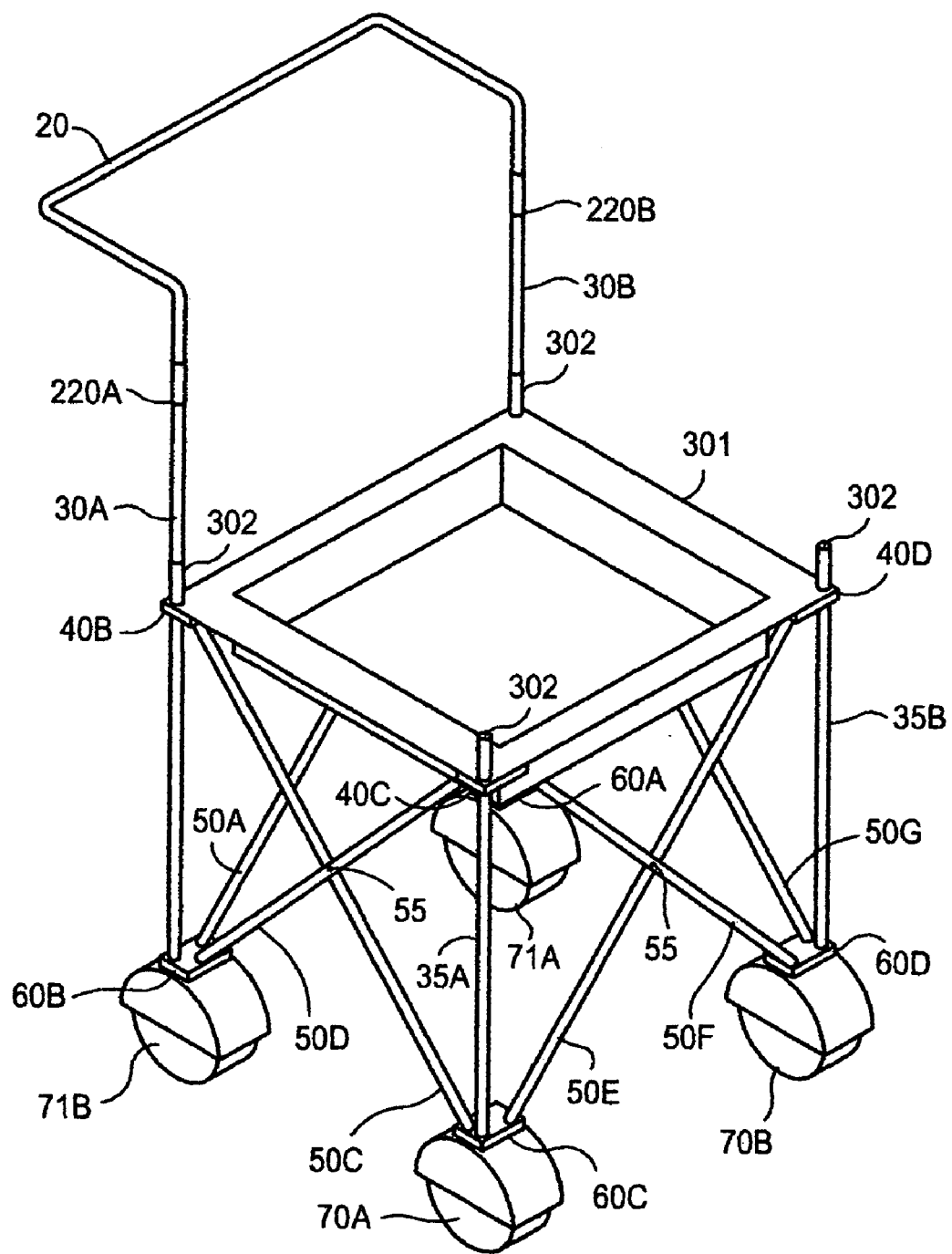
FIG. 11 illustrates a rigid Structure Locking Element attached to vertical posts passing through corner brackets.
12.
Figure 12:
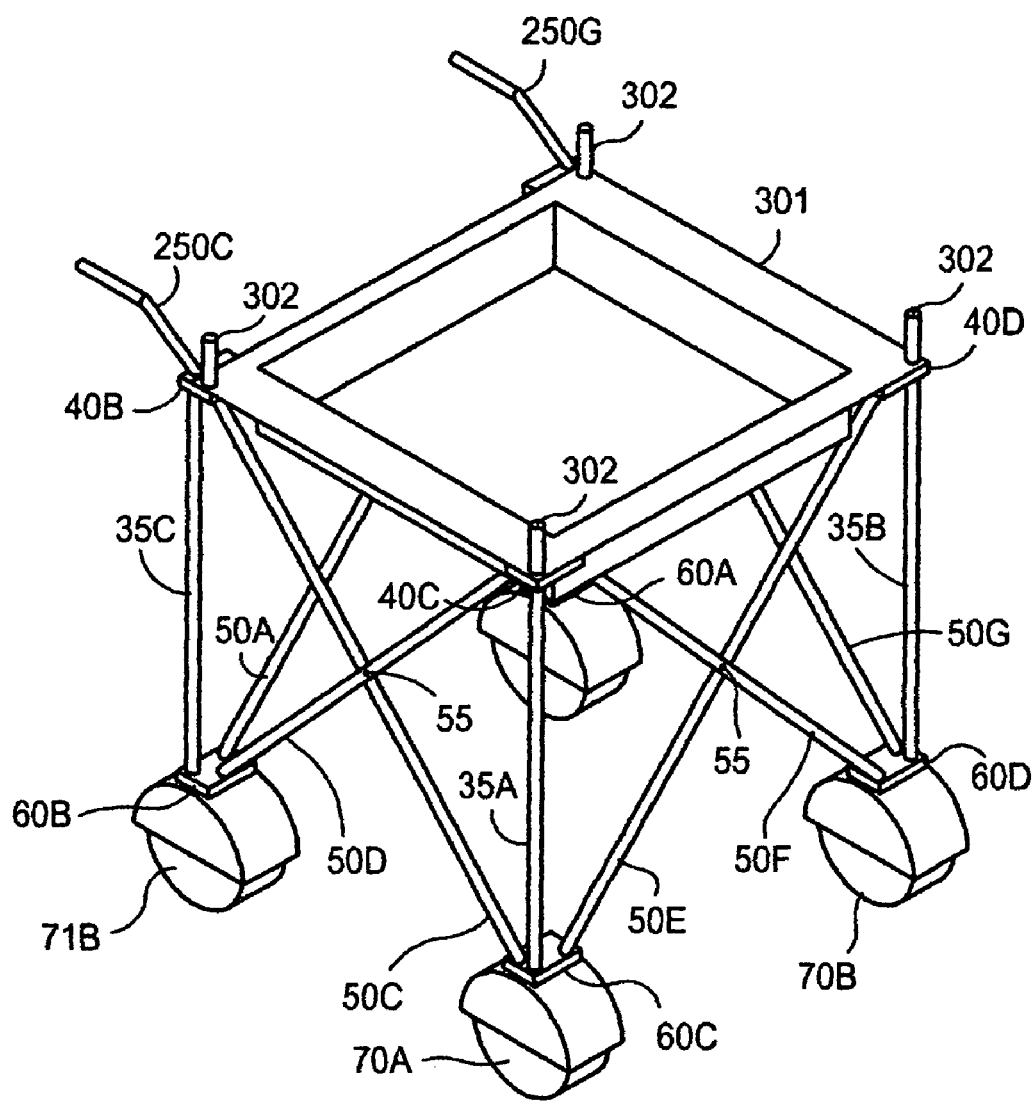
FIG. 12 illustrates using crossed arm support extensions as handles.
13.

FIG. 12 is similar to FIG. 11, and is used to illustrate yet another method for providing handles for a cart. In this embodiment, the upper ends 250C and 250G of side support arms 50C and 50G are extended through the upper corner brackets 40A and 40B and are pivotally attached to said brackets. (This is similar to the method described for creating armrest supports in the Parent application.) Said extensions of upper side support arm 250C and 250G are bent in a way that caused them to be parallel with the ground when the cart is in its open position. The rear vertical posts 30A and 30B are replaced by telescoping anti-torque posts 35C and 35D. Like previously described handles or push bars that are attached to vertical posts this type of handle can also be used to lift, tilt, push or pull a cart.

Example 4: In this final example we illustrate another new concept, using more than one SLE on the same collapsible frame and one or more Structure Locking Elements performing more than one function. In this example, the device being illustrated is a wheeled animal cart. FIG. 13 illustrates a rigid SLE 304 attached to the lower corner brackets 61 and an offset flexible SLE 200 attached to the upper corner brackets used to configure such a collapsible cart frame.

Figure 14:
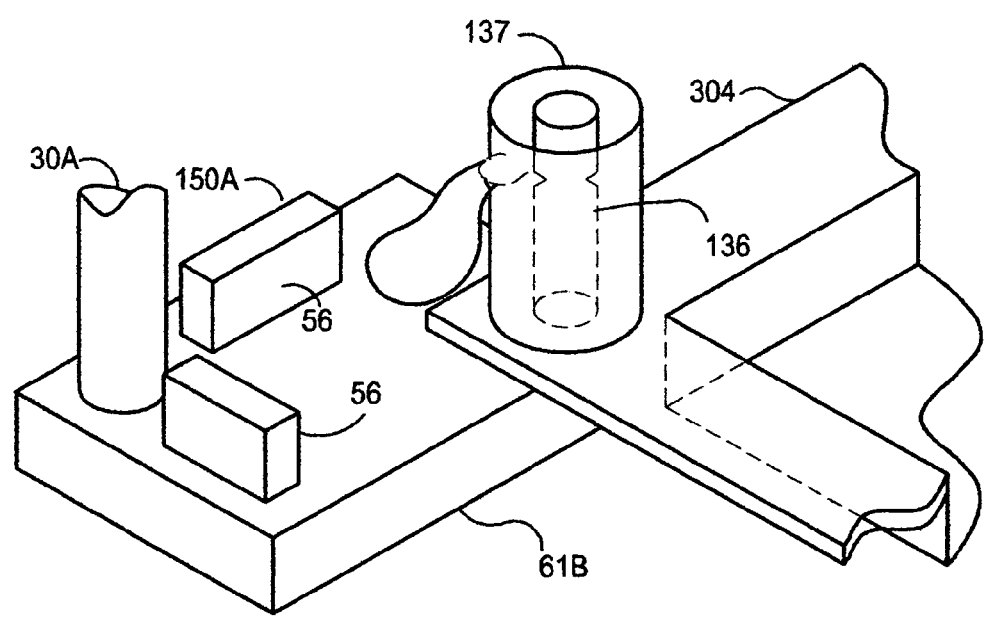
FIG. 14 is an expanded view of the lower corner bracket area of FIG. 13 illustrating the Structure Locking Element mounting post and cam lock end cap.
15.

FIG. 14 is an expanded view of the area around the lower corner bracket 61B in FIG. 13. FIG. 14 illustrates an SLE mounting post 136 that has been added to each corner bracket 61 upon which a rigid SLE 304 is mounted. A cam lock end cap 137 is attached to the top of each SLE mounting post 136 to secure the rigid SLE 304 to each SLE mounting post 136. The mounting blocks 150A and 150D are where crossed support arms 50A and 50D are pivotally attached at 56. In this example the rigid SLE 304 performs a dual function: first as an SLE to establish the frame structure and second as a tray on which to support the weight an animal.

Looking again at FIG. 13 we see the upper SLE 200 is attached to the upper corner brackets 40 in a manner similar to that previously described in Example 2. When the collapsible cart frame is open and held in place by SLE 200, the rigid SLE 304 can be mounted on the SLE mounting posts 136 and secured by cam lock end caps 137 thus creating a frame supported by two Structure Locking Elements.

Figure 15:
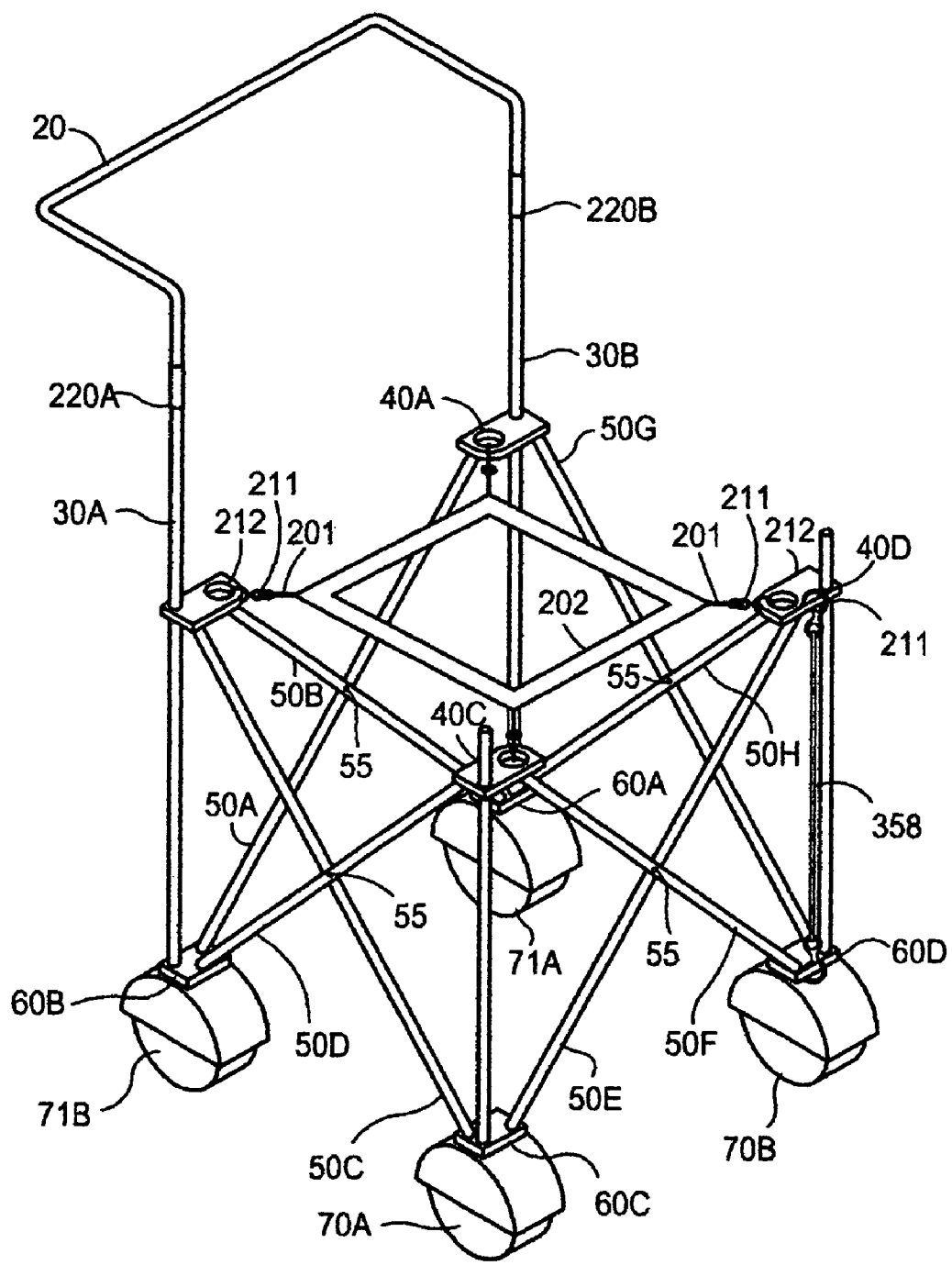
FIG. 15 illustrates a collapsible frame with an Anti Collapse Locking Mechanism attachment.
16.

Turning now to another new embodiment that we define as the "Anti-Collapse Locking Mechanism". We use FIG. 15 to introduce the new concept of a flexible or rigid Anti-Collapse Locking Mechanism. In FIG. 15, shackles 211 are attached to each end of a nylon belt 139. One shackle 211 on the end of the nylon belt is clipped to the clip ring 212 in upper corner bracket 40D previously described in FIG. 10. A similar clip ring 212 has been incorporated into the lower corner bracket 60D and the other shackle 211 is clipped to the lower corner bracket 40D thus preventing the structure from collapsing should upward, downward or sidewise pressure be applied to the upper Structure Locking Element 202. For crib, play pens, and animal crates and cart applications discussed later in this application, it is most desirable to lock the collapsible frame in an open position with an Anti-Collapse Locking Mechanism to prevent a child or animal from pushing on a SLE and accidentally collapsing the frame and causing injury.

Any rigid or flexible means or structure can be used to create an Anti-Collapse Locking Mechanism as long as it prevents the upper and lower corner brackets from separating and thus collapsing the frame while the device is in an open position. For example, Anti-Collapse Locking Mechanisms may be incorporated into rigid vertical posts, flexible sidewalls of a crib or animal crate or as separate members as demonstrated by the nylon strap 139 in FIG. 15.

Figure 16:
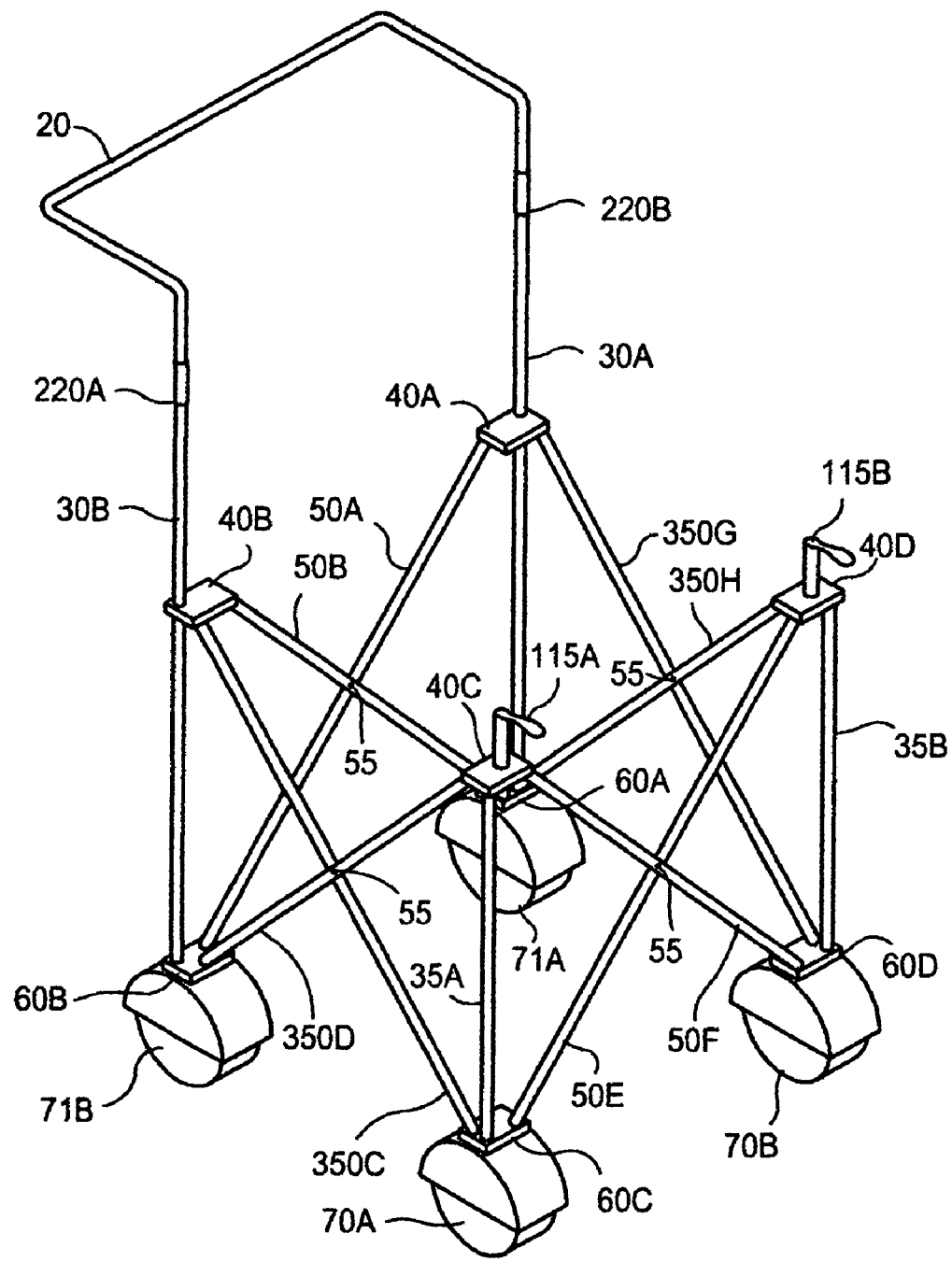
FIG. 16 illustrates telescoping crossed support arm assemblies that are used to adjust the length of a cart.
17.
Figure 17:
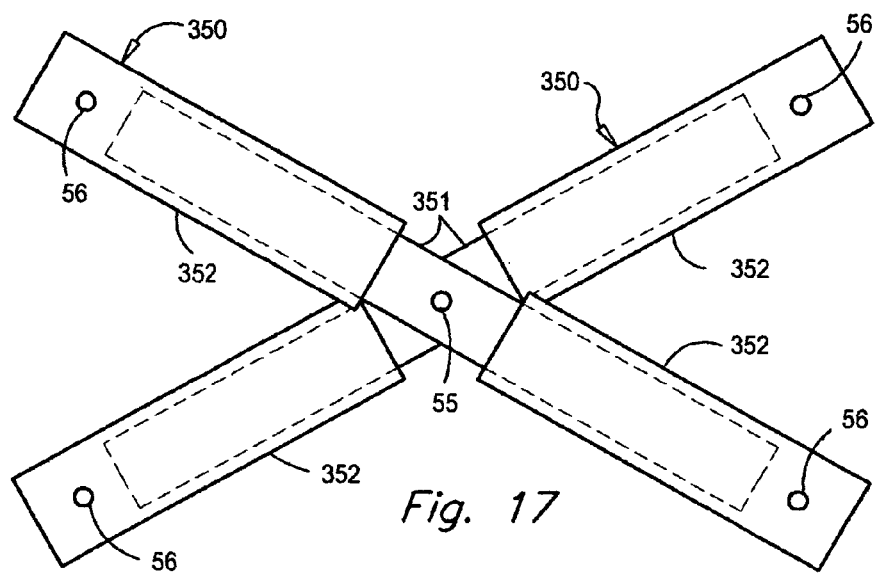
FIG. 17 illustrates the inner and outer tubular sections of a telescoping crossed support arm assembly of the type employed in this invention.
18.

In yet another embodiment of the invention we disclose how to adjust at least one dimension (length, width, or height) of the basic cart illustrated in FIG. 4. FIG. 16, illustrates adjustability in the front to back direction. In FIG. 16, the crossed support arms 50C and 50D and 50G and 50H shown in FIG. 4 have been replaced by two pair of pivotally connected telescoping crossed support arm assemblies 350C and 350D and 350G and 350H. FIG. 17, illustrates a pair of telescoping crossed support arm assemblies 350 where each support arm is essentially identical with its pivotally bound counter part and each crossed support arm is comprised of an intermediate tubular section 351 and a pair of outer tubular sections 352 that telescope opposite ends into and out of said intermediate section 351. The telescoping crossed support arms in FIG. 17 are illustrated as having hollow intermediate tubular sections 351 and outer tubular sections 352, however, either the outer or the inner sections may be solid and the sections may slide over each other in either direction.

The point where the telescoping support arms 350 bisect each other and are pivotally connected is shown as 55. The point where each crossed support arm 350 is pivotally connected to an upper or lower corner bracket 40 or 60 is shown as 56.

Figure 18:
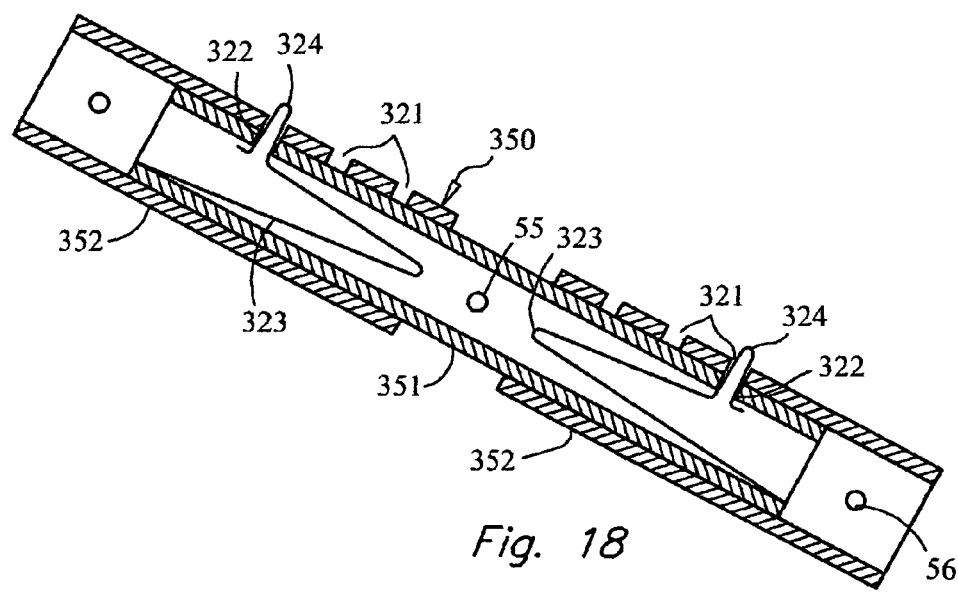
FIG. 18 illustrates a mechanism for locking the inner and outer telescoping tubular sections of the crossed support arm assemblies at points equal distance from the point of intersection of the two cross support arms.
19.

FIG. 18 illustrates a means for locking all of the outer telescoping tubular sections 352 at positions equal distance to the pivotal connection point 55. Each outer tubular section 352 has formed therein a plurality of longitudinally spaced holes 321. Said holes 321 are spaced identically for each of the outer tubular sections 352 and on both sides. Thus assuring that the pivotal connection point 55 for each pair of crossed support arms 350 remains centered within the side defined by a string stretched around the outmost ends of the four outer tubular sections 352 and because opposite sides are also identical, the opposite side is also centered in an identical position. Each intermediate tubular section 351 has a hole 322 formed therein similar to hole 321. A hairpin or V-shaped leaf spring 323 is housed in the inner end of each tubular section 351 and compressed between the opposing inside faces of tubular proximate holes 322. One of the legs of each leaf spring 323 is provided with a radially projecting button 324 terminating in a rounded end and slidable engaging hole 322 and a selected axially aligned hole 321 to releasably lock intermediate tubular section 351 and respective tubular elements 352 and thus releasably lock crossed support arm assemblies 350 at a desired adjusted length.

Figure 19A:
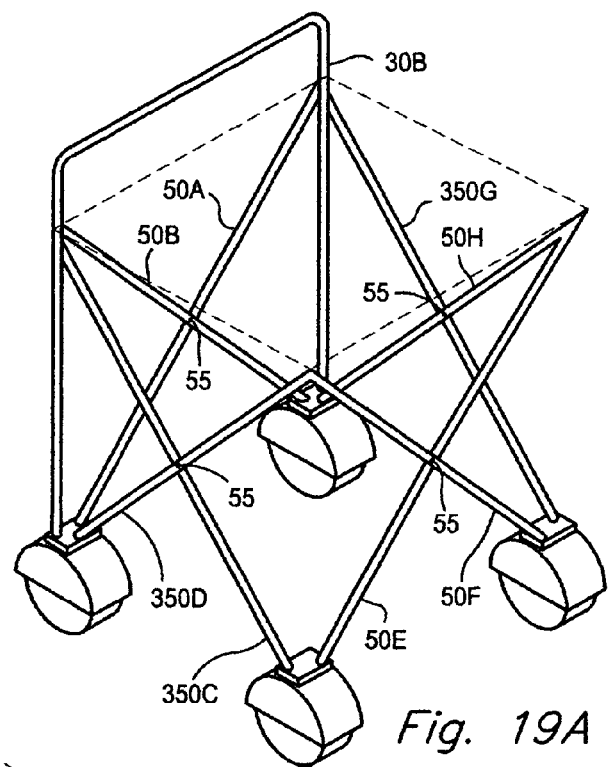
FIG. 19A is a schematic illustration with telescoping crossed support arm assemblies unextended.
20.
Figure 19B:
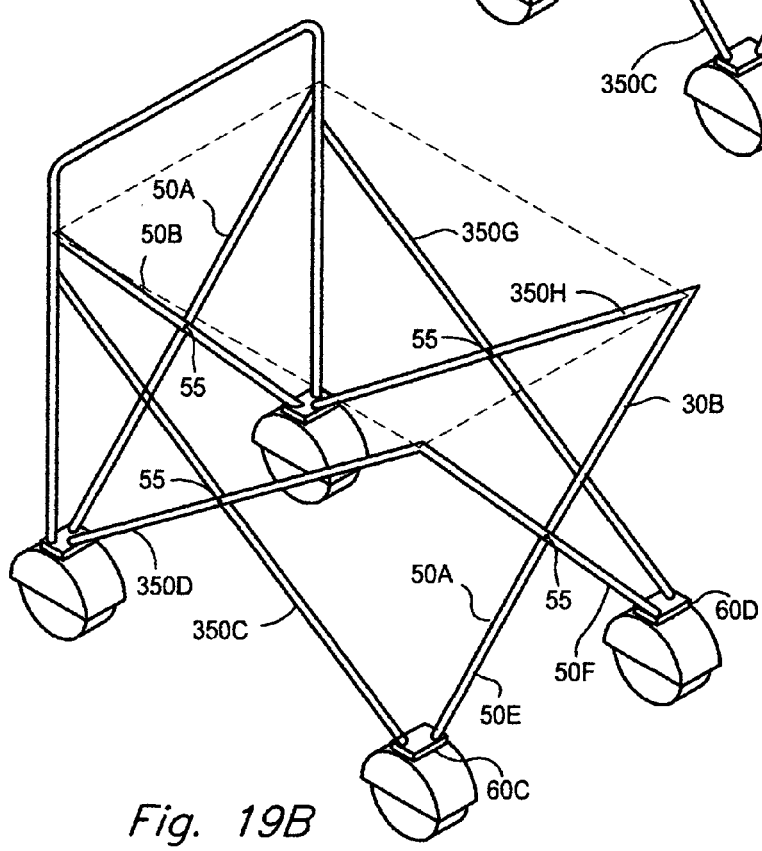
FIG. 19B illustrates the cart of 19A with telescoping crossed support arm assemblies extended.
21.

FIG. 19A is a schematic illustration of the cart frame in FIG. 16 with the telescoping crossed support arm 350C and 350D and 350G and 350H in an non-extended position. FIG. 19B shows the same frame with telescoping crossed support arm assemblies 350C and 350D and 350G and 350H extended. Thus, by extending all of the telescoping opposite side crossed support arms (this keeps the bisecting points of the two sides of the cart centered) the length of the cart can be extended without changing the height or width. The width of a cart can also be adjusted by applying the same principle of telescoping crossed support arms to the front side and back side. Like wise, the length and the width can both be adjusted independently of each other on the same cart by using telescoping crossed support arm pairs on all sides of a cart. Moreover, a cart's height can also be raised or lowered while keeping the same width and length through the use of telescoping crossed support arm pairs on all sides.

Figure 20:
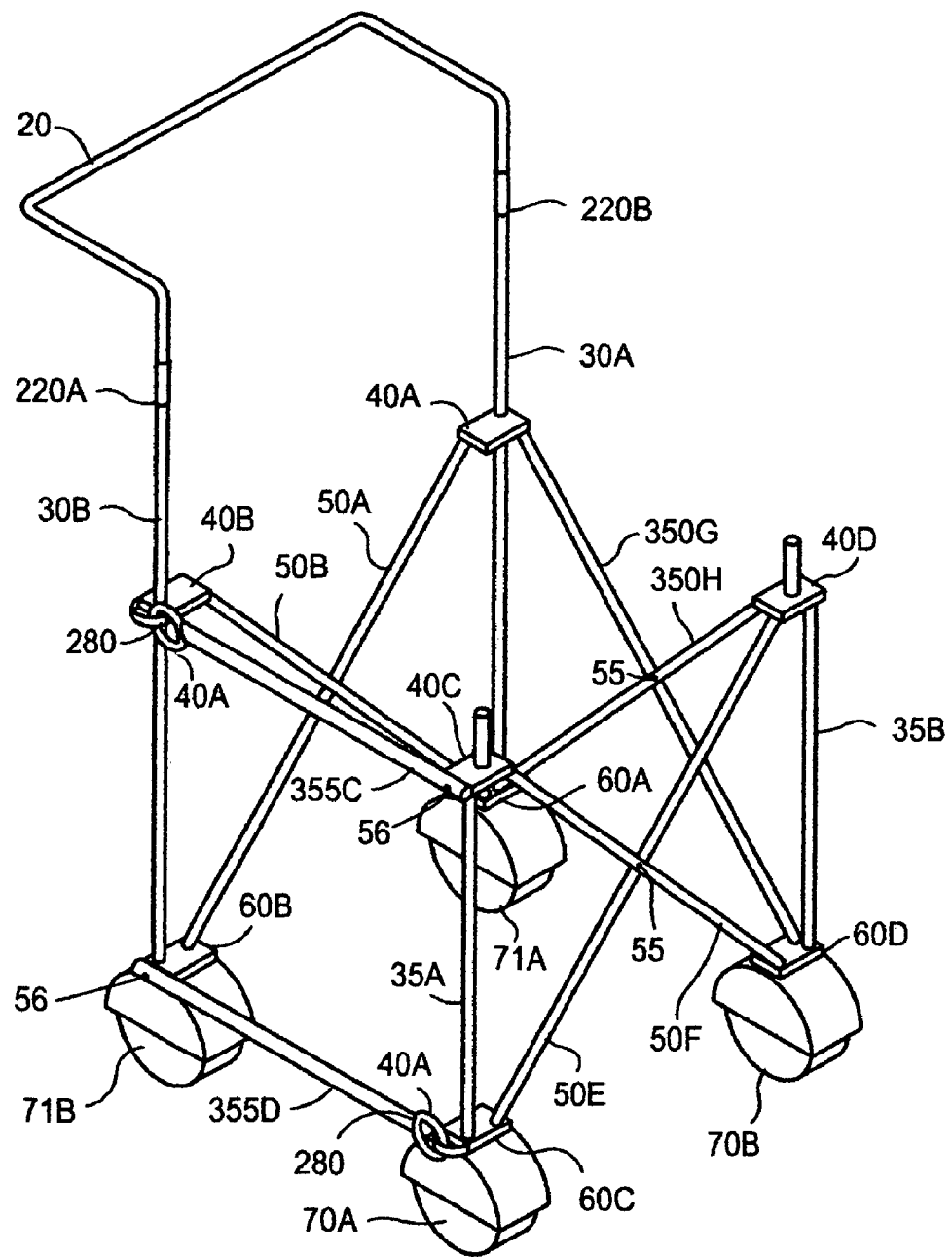
FIG. 20 illustrates an extendable collapsible cart having pivotally connected detachable telescoping horizontal support bar assemblies.
22.

In yet another embodiment of the invention an adjustable collapsible cart, FIG. 20 illustrates a cart having telescoping crossed support arm assemblies 350G and 350H on one side and pivotally connected detachable telescoping horizontal support bar assemblies 355C and 355D on the other side.

As illustrated in FIG. 20, the detachable telescoping horizontal support bar 355C is pivotally connected to front upper corner bracket 40C at 56 and has a snap fitting 280 mounted on the other end in order to quickly connect and disconnect from the front upper corner bracket 40B. The other detachable telescoping support bar 355D is pivotally connected to front lower corner bracket 60B and has a snap fitting 280 mounted on the other end in order to quickly connect and disconnect from the front lower corner bracket 60C. The rear upper corner bracket 40B and the front lower corner bracket 60C have been modified to include a ring into which the snap fittings 280 can be connected. The pivotally connected detachable telescoping horizontal support bar assemblies 355C and 355D telescope in a manner similar to that previously described for an intermediate and outer section of a telescoping crossed support arm.

Figure 21:
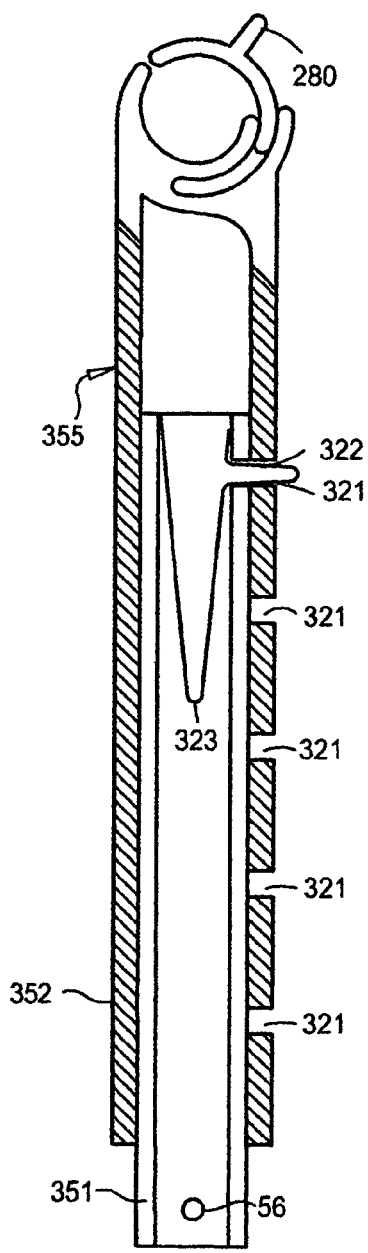
FIG. 21 illustrates a pivotally connected detachable telescoping horizontal support bar.
23.

As illustrated in FIG. 21, each pivotally connected telescoping support bar 355 has an inner tubular section 351 that slides within an outer tubular section 352. The outer tube 352 has formed therein a plurality of longitudinally spaced holes 321. Said holes 321 are spaced to create a predetermined bar length. The intermediate tubular section intermediate tubular section 351 has a hole 322 formed therein similar to hole 321. A hairpin or V-shaped leaf spring 323 is housed in the inner end of each tubular section 351 and compressed between the opposing inside faces of tubular proximate holes 322. One of the legs of each leaf spring 323 is provided with a radially projecting button 324 terminating in a rounded end and slidable engaging hole 322 and a selected axially aligned hole 321 to releasably lock intermediate tubular section 351 and respective tubular element 352 and thus releasably lock the telescoping horizontal support bar 355 in a fixed position. Predetermined bar lengths are established to keep the frame in a rectangular shape, thus keeping an equal distance between upper corner brackets 40C and 40B and 40A and 40D and lower corner brackets 60A and 60D and 60C and 60B.

Figure 22A:
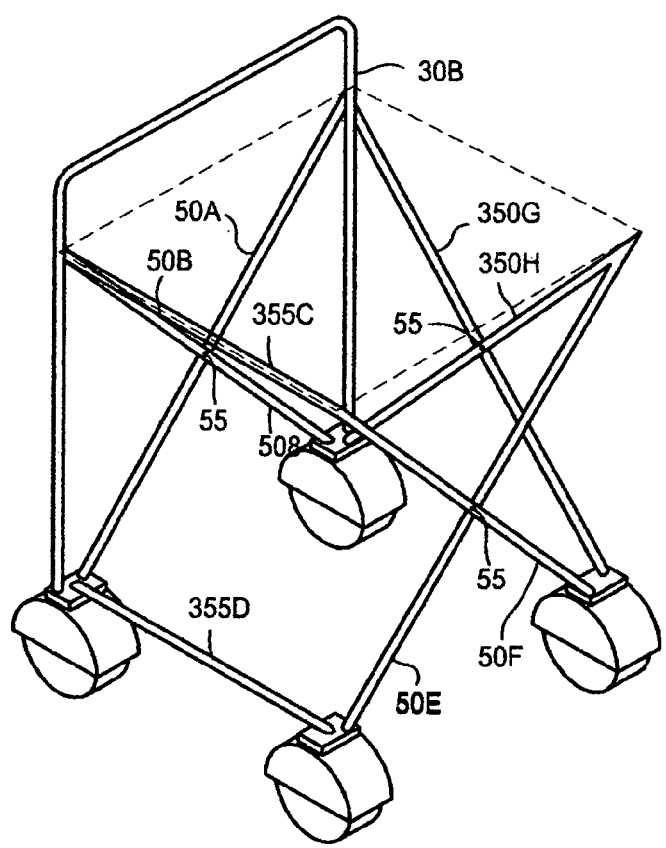
FIG. 22A is a schematic illustration of a cart having pivotally connected detachable telescoping horizontal support bar assemblies in an open but unextended position.
24.
Figure 22B:
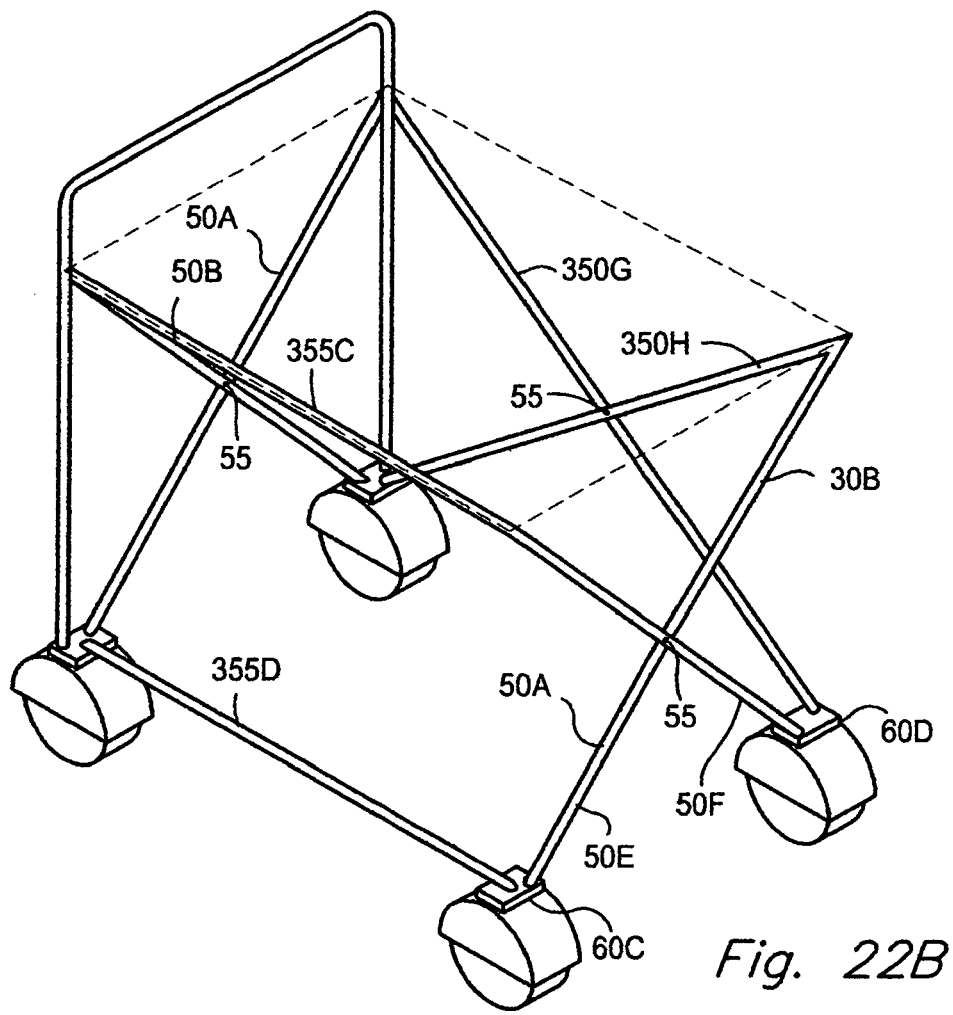
FIG. 22B is a schematic illustration of a cart having pivotally connected detachable telescoping horizontal support bar assemblies in an open and extended position.
25.

FIG. 22A is a schematic illustration of the cart frame in FIG. 20 with the telescoping crossed support arm assemblies 350G and 350H the detachable telescoping horizontal support bar assemblies 355C and 355D in an open non-extended position. FIG. 22B shows the same frame with telescoping crossed support arm assemblies 350G and 350H and the detachable telescoping horizontal support bar assemblies 355C and 355D extended. Thus, by extending all of the telescoping crossed support arm assemblies 350G and 350H and keeping the bisecting point centered and by extending the detachable telescoping horizontal support bar assemblies 355C and 355D the length of the cart can be extended without changing the height or width. The width of a cart can also be adjusted by applying the same principle of telescoping crossed support arm assemblies to the front side or back side and detachable telescoping horizontal support bar assemblies to the opposite front or back side. Like wise, the length and the width can both be adjusted independently of each other on the same cart by using a combination of telescoping crossed support arm pairs and detachable telescoping horizontal support bar assemblies on all sides of a cart. Moreover, a cart's height can also be raised or lowered while keeping the same width and length through the use of telescoping crossed support arm pairs on all sides.

Referring now to the wheels for the collapsible frame structures disclosed in this specification. Because each corner bracket must move in both the X and Y direction to open, close or expand the collapsible structures described in this specification, a wheel or set of wheels must be mounted at each corner bracket for wheeled collapsible structures. These wheels will typically be of the caster type, however, any set of wheel that can be mounted from the corner brackets is acceptable. In known fixed attachment systems, casters can be mounted in vertical posts such as the vertical rear support posts, 30A and 30B (FIG. 1). Alternatively, casters can be mounted to the lower corner brackets, 60A, 60B, 60C, and 60D, (FIG. 1).

Figure 23:
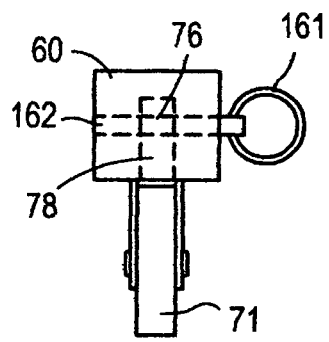
FIG. 23 illustrates a quick connect caster mounting to a corner bracket.
26.

One of the preferred means for caster attachment to the collapsible frames is a quick connect and disconnect attachment system as illustrated in FIG. 23 (FIG. 6B from CIP-1). As illustrated, each lower corner bracket 60 has an opening into which the caster's stem 78 slides. The caster 71 is attached to the corner bracket by a removable pin 161 which slides through a prebored hole in the corner bracket 162 and through a prebored hole in the caster stem 76. Thus, each caster can be rapidly locked into a corner bracket 60 by inserting the pin 161 as described or unlocked when the pin 161 is removed, thereby providing a quick connect means.

Selection of the type of caster to be used on the collapsible frame is optional and will depend upon the end use application. Both rigid casters that have a fixed direction and swivel casters that rotate will provide satisfactory results on the collapsible frame. Typically, a set of both rigid and swivel casters will be selected with the rigid casters generally located under the back of the collapsible frame where the handle is generally located.

Figure 24:
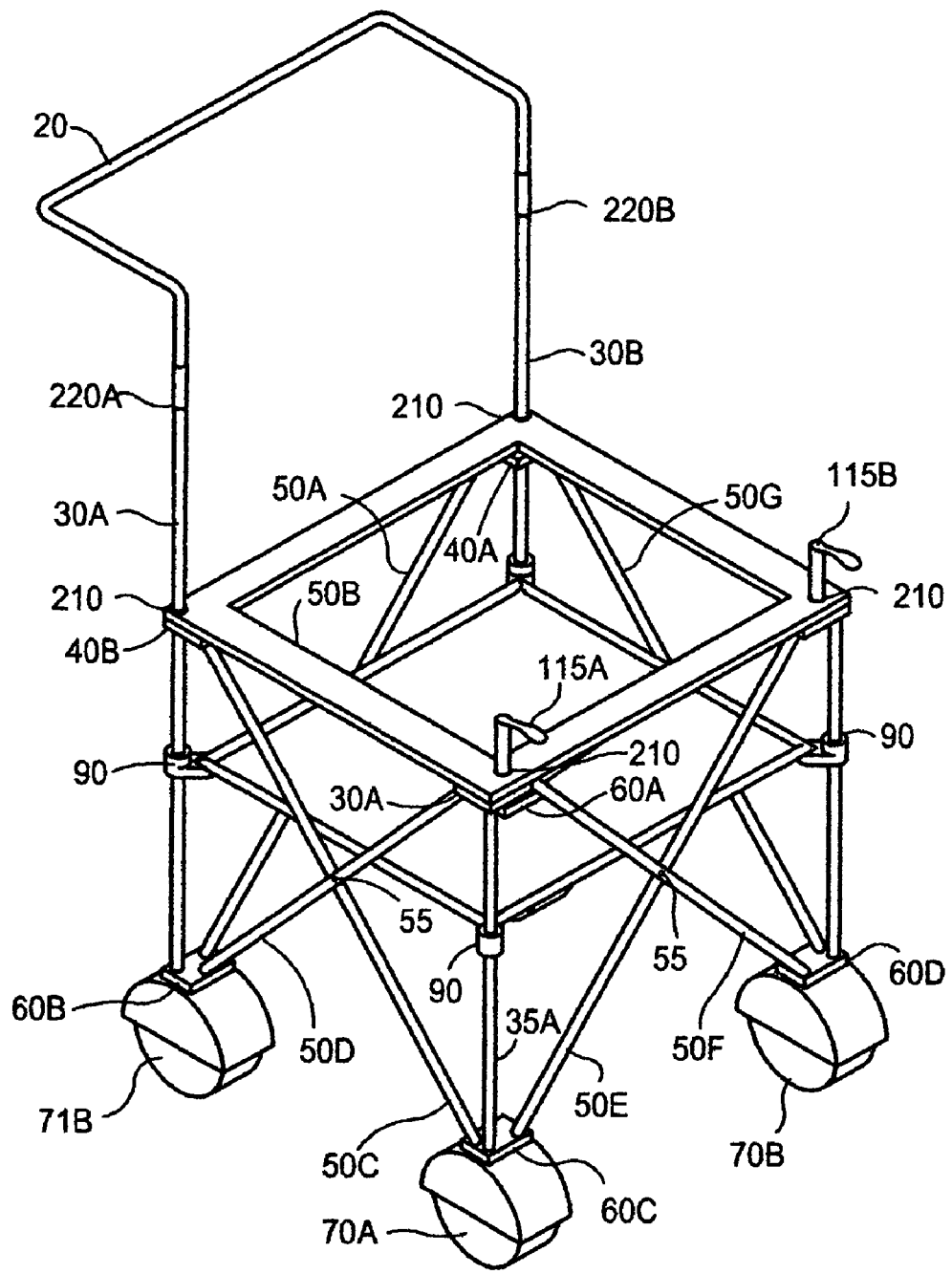
FIG. 24 illustrates shelf attachment fixtures attached to the four vertical posts for mounting an intermediate rigid shelf.
27.

Previously we have talked about shelves that can be attached at the upper or lower corner brackets that may also function as Structure Locking Elements. Another embodiment of the invention relates to collapsible shelves that are intermediate to the upper and lower corner brackets. These shelves may be either rigid or flexible and may be detachable or fixed. A rigid shelf is illustrated in FIG. 24. Shelf attachment fixtures 90 for mounting a rigid shelf are attached to the four vertical posts 30A, 30B, 35A and 35B and an intermediate rigid shelf 400 is then mounted on the fixtures after the cart is in an open position and is removed prior to collapsing the cart. For the case of a flexible shelf such as netting, the attachment fixtures 90 could be clips mounted on the posts and attached to four corners of a mesh net. Such a mesh net shelf would not have to be removed when the cart was open and collapsed.

Referring now to cribs, beds, playpens, pens or play yards or a combination of these devices for use by babies, young children or pets. When the words crib, bed, playpen, pen or play yard are used in this specification it should be understood that they are being used interchangeably within this specification.

The collapsible frame structures that have previously been described for the construction of carts are also applicable to those of cribs, beds, playpens, play yards and bed rails. When referring to the following drawings we continue to use like reference characters. Looking now at the collapsible open-topped is frame 100, shown in FIG. 25, which can fulfill the function of a collapsible frame for a sleeping bed or crib for a baby or young child or as a frame for a playpen or play yard when the baby or young child is not sleeping, we see the same elements previously described for collapsible carts.

Figure 25:
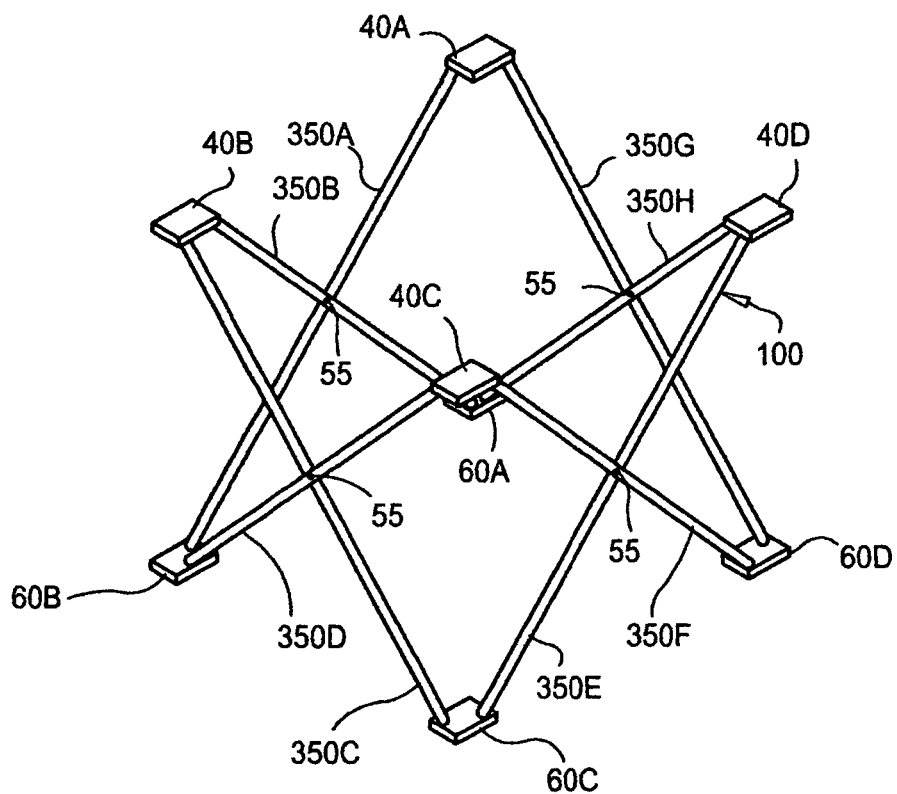
FIG. 25 illustrates an extendable collapsible crib frame.

The open topped collapsible frame in FIG. 25 is comprised of four telescoping sides with each side having a pair of crossed support arms 350A and 350B, 350C and 350D, 350E and 350F and 350G and 350H. Each pair of crossed support arms 350A and 350B, 350C and 350D, 350E and 350F and 350G and 350H are pivotally connected at the their center of rotation 55 and all crossed support arms 350 are of equal length.

As illustrated in FIG. 17, each crossed support arms 350A and 350B, 350C and 350D, 350E and 350F and 350G and 350H are essentially identical in construction with each arm comprised of an intermediate tubular section 351 and a pair of outer tubular sections 352 that telescope opposite ends into and out of said intermediate section 351. FIG. 18 illustrates a means for locking the outer telescoping tubular sections 352 at points equal distance to the pivotal connection point. Each outer tubular section 352 has formed therein a plurality of longitudinally spaced holes 321. Said holes 321 are spaced identically for each of the out tubular sections on a side and for each of the tubular sections on the side opposite. Thus assuring that the pivotal connection point 55 for each pair of crossed support arms 350 remains centered within the side defined by a string stretched around the outmost ends of the four outer tubular sections 352 on each side and also centered with the side opposite. Each intermediate tubular section 351 has a hole 322 formed therein similar to hole 321. A hairpin or V-shaped leaf spring 323 is housed in the inner end of each tubular section 351 and compressed between the opposing inside faces of tubular element 351 proximate holes 322. One of the legs of each leaf spring 323 is provided with a radially projecting detent 324 terminating in a rounded end and slidably engaging hole 322 and a selected axially aligned hole 321 to releasably lock intermediate tubular section 351 and respective tubular elements 352 and thus releasably lock telescoping crossed support arms 350 at a desired adjusted length.

For purposes of explanation the crib's 100 sides shall be labeled as follows, the side containing telescoping crossed support arms 350A and 350B shall be designated as the back and the side containing telescoping crossed support arms 350E and 350F shall be designated as the front. The left side as seen from the back facing the front incorporates telescoping crossed support arms 350G and 350H and the right side incorporates telescoping crossed support arms 350C and 350D.

As illustrated in FIG. 25, the crib 100 is comprised of four upper corner brackets 40A, 40B, 40C and 40D and four lower corner brackets 60A, 60B, 60C, and 60D and have telescoping cross support arms 350A and 350B, 350C and 350D, 350E and 350F and 350G and 350H attached to them as follows. The lower ends of the front right and left crossed support arms 350E and 350F and the lower ends of the right side telescoping crossed support arm 350C and the left side crossed support arms 350G are connected to the lower right and left front corner brackets 60C and 60D; and the lower ends of the right and left rear crossed support arms 350B and 350A and the lower end of the rear right side telescoping crossed support arm 350D and the left side telescoping crossed support arm 350H are connected to lower right and left rear corner brackets 60B and 60A; and similarly, the upper ends of the left and right front telescoping crossed support arms 350F and 350E and the upper front ends of the right and left side telescoping crossed support arms 350D and 350H are connected to upper right and left front corner brackets 40C and 40D and upper ends of the left and right rear crossed support arms 350A and 350B and the upper back ends of the right and left side telescoping crossed support arms 350C and 350G are connected to the upper right and left rear corner brackets 40B and 40A.

Figure 26A:
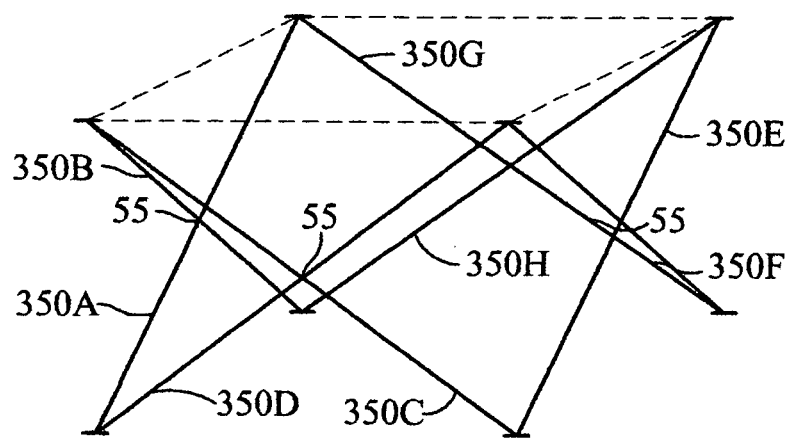
FIG. 26a illustrates an extendable collapsible crib frame in an open extended position.
Figure 26B:
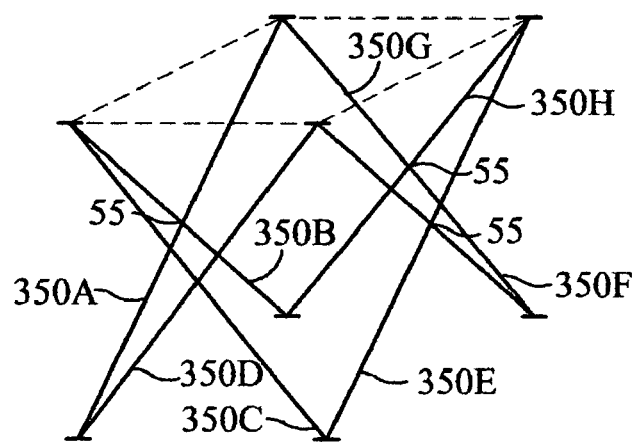
FIG. 26B illustrates an extendable collapsible crib frame in an open unexteded position.
Figure 26C:
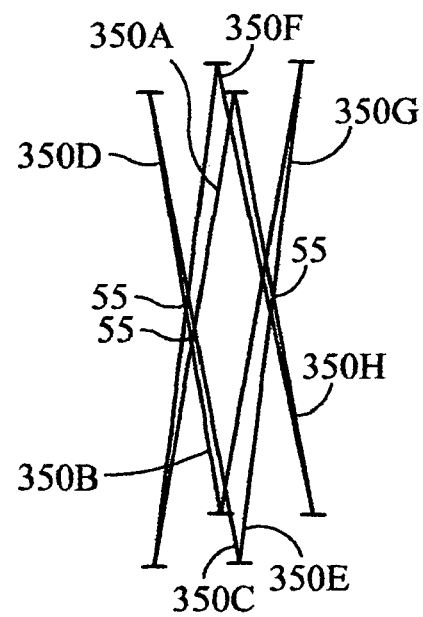
FIG. 26C illustrates an extendable collapsible crib frame in a partially closed position.

All of the crossed telescoping support arms 350 are pivotally connected to the four upper corner brackets 40A, 40B, 40C and 40D and four lower corner brackets 60A, 60B, 60C, and 60D allowing the frame to expand or collapse simultaneously in both the X and Y direction. This is shown in FIG. 26A, FIG. 26B and FIG. 26C which illustrate respectively through schematic drawings, an open collapsible crib frame with telescoping crossed support arms extended, an open collapsible crib frame with telescoping arms unextended and a nearly collapsed crib frame. In the near closed position illustrated in FIG. 26C it can be seen that as the collapsible frame is closed all crossed support arms become essentially parallel to each other and upper and lower corner brackets will be separately aggregated together.

Figure 27:
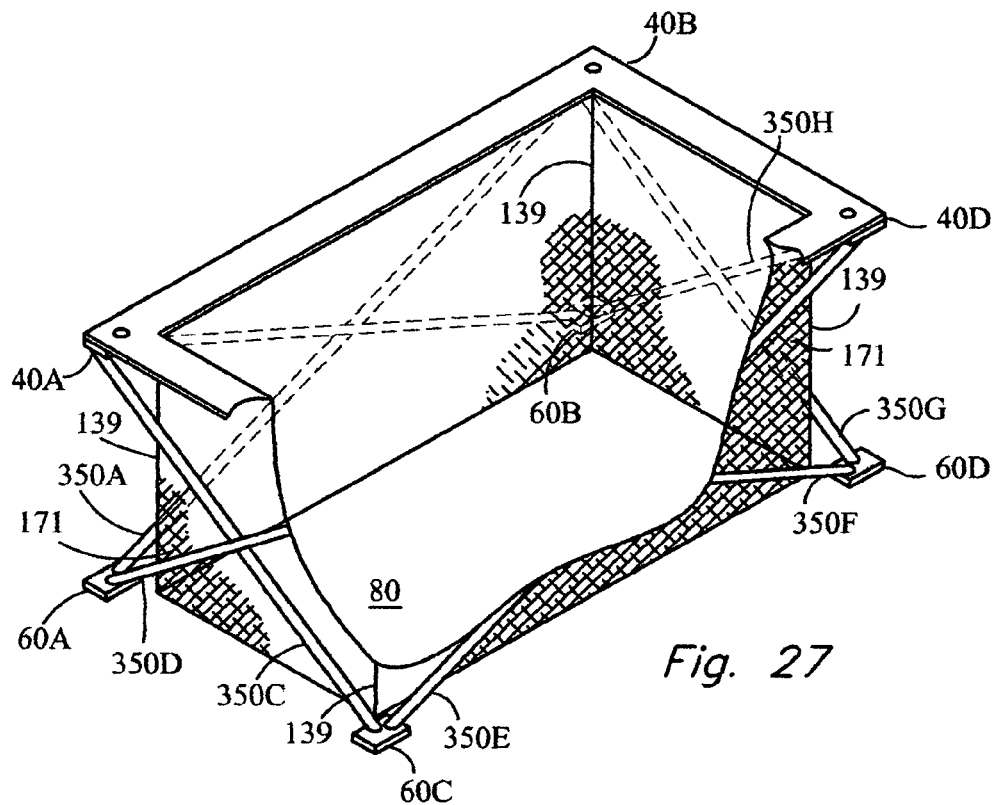
FIG. 27 illustrates a collapsible crib frame with flexible sidewalls and a flexible bottom.

FIG. 27 is a cut away view of a crib frame that has flexible sidewalls 171 and a flexible bottom 80 attached. In the preferred embodiment of the invention, the sidewalls incorporate an SLE strap or web 200 into their construction. Said sidewalls 171 are generally placed inside the frame to form a protective barrier against a child falling and hitting the crossed support arm. The sidewalls 171 will generally be constructed of a flexible mesh fabric and the bottom will be made of a moisture barrier material to protect beds from possible urination accidents and children from dampness and moisture from the ground when used as a playpen. In a preferred embodiment, the perimeter formed by the sidewalls 171 is designed to be smaller than the perimeter defined by the four upper corner brackets 40 or the lower corner bracket 60. In this example, the sidewalls are also designed to act as an Anti Collapse Locking Mechanism. The sidewalls 171 are attached to the lower corner brackets when the crib is open thus locking the structure in an open position by preventing the upward movement of the upper corner brackets 40 that is required to collapse the structure when the collapsible frame is sitting on a hard surface.

As in the structure of FIG. 15, the crib comprises an anti-collapse mechanism (139) witch is a non-expanding, flexible material used to detachably connect at least one lower corner bracket of the crib to its vertically aligned upper bracket.

A removable mattress (not shown) may also be added to the bed or play pen.

Figure 28:
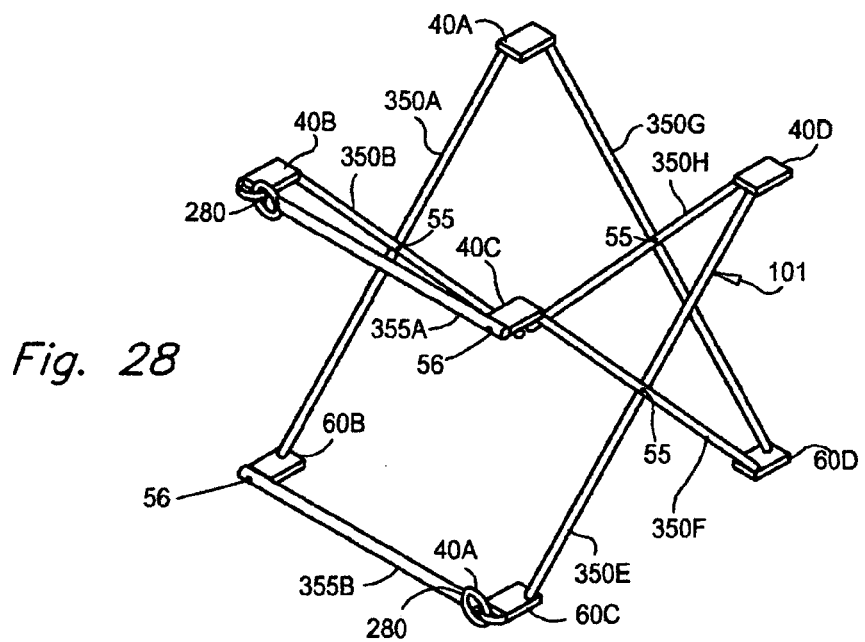
FIG. 28 illustrates a collapsible crib frame constructed with detachable telescoping horizontal support bar assemblies.

In yet another version of the collapsible crib frame as illustrated in FIG. 28, the back, front and left sides of the crib are constructed as previously described in FIG. 25. For purposes of explanation, the four-sided crib frame 101 illustrated in FIG. 28 has been labeled in a manner similar to that of the four-sided crib frame of FIG. 25. The side containing telescoping crossed support arms 350A and 350B is designated as the back, the side containing telescoping crossed support arms 350E and 350F is designated as the front and the side containing cross support arms 350G and 350H is designated as the left side. The remaining side is comprised of two telescoping horizontal telescoping crossed support arms 355A and 355B and is designated as the right side.

Each pair of telescoping cross support arms 350 is pivotally connected where the support arms bisect each other and are of equal length. As illustrated previously in FIG. 17, each telescoping crossed support arm is essentially identical and is comprised of an intermediate tubular section 351 and a pair of outer tubular sections 352 that telescope opposite ends into and out of said intermediate section 351 and is similar in functionality to those described in FIG. 25. FIG. 28 illustrates, two detachable telescoping horizontal support bar assemblies 355. One support bar 355B is pivotally connected to front lower corner bracket 60B and has a snap fitting 280 mounted on the other end in order to quickly connect and disconnect from the front lower corner bracket 60C. The other detachable telescoping horizontal support bar 355A is pivotally connected to the front upper corner bracket 40C and has a snap fitting 280 mounted on the other end in order to quickly connect and disconnect from the upper corner bracket 40B. The detachable telescoping horizontal support bar assemblies 355A and 355B telescope in a manner similar to that previously illustrated in FIG. 21. Each bar has an inner tubular section 351 that slides within an outer tubular section 352. The outer tube 352 has formed therein a plurality of longitudinally spaced holes 321. Said holes 321 are spaced to create a predetermined bar length when the previously described V-shaped or hairpin spring 323 is engaged into a specific hole. The predetermined bar lengths are established to keep the frame in a rectangular shape, thus keeping an equal distance between upper corner brackets 40A and 40D and 40B and 40C and lower corner brackets 60A and 60D and 60B and 60C.

As illustrated in FIG. 28, the crib frame 101 is comprised of four upper corner brackets 40A, 40B, 40C and 40D and four lower corner brackets 60A, 60B, 60C and 60D. All telescoping crossed support arms 350 for the back and left and right sides are connected to the upper and lower corner brackets as described in FIG. 25. The pivotal end of the upper detachable telescoping horizontal support bar 355A is attached to the upper corner bracket 40C and the pivotal end of the lower detachable telescoping horizontal support bar 3556B is attached to the lower corner brackets 60B.

Thus, the three pair of telescoping crossed support arms, the detachable horizontal telescoping support bar assemblies and the corner brackets form a size adjustable, collapsible open topped frame when the upper corner brackets 40 and the lower corner brackets 60 are spread apart and the horizontal telescoping bar assemblies 355 are connected. The collapsible frame can be made into a crib and locked into position with the addition of an SLE. We have previously described in FIG. 27 an SLE 200 incorporated into the sidewalls 171, and a bottom 80 that could also be used with the collapsible frame illustrated in FIG. 28. As previously described for FIG. 25, the crib frame is locked into its open position by SLE 200 which has been incorporated into the sidewalls 171 and the side walls also acts as an Anti Collapse Locking Mechanism.

When it is desired to collapse the frame illustrated in FIG. 28 for storage or transit, the two detachable horizontal support bar assemblies, 355A and 355B are detached from corner brackets 60C and 40D. Once detached, these brackets can be telescoped inwards upon themselves and rotated so to a vertical alignment. Thus when all of the upper corner brackets are together, and all of the lower corner brackets are together, and all of the crossed support arms are lined up in essentially parallel alignment, the two detachable horizontal bar assemblies, 355A and 355B will also lay essentially in parallel alignment.

Because it is possible for one skilled in the art to construct many different variations of expandable collapsible structures using combinations of the embodiments of pivotally connected cross support arms 50, pivotally connected telescoping cross support arms 350, telescoping anti-torque posts 35 and detachable horizontal telescoping support bar assemblies 365 disclosed in this specification, we will limit the discussion of collapsible frame design to those already disclosed.

Figure 29:
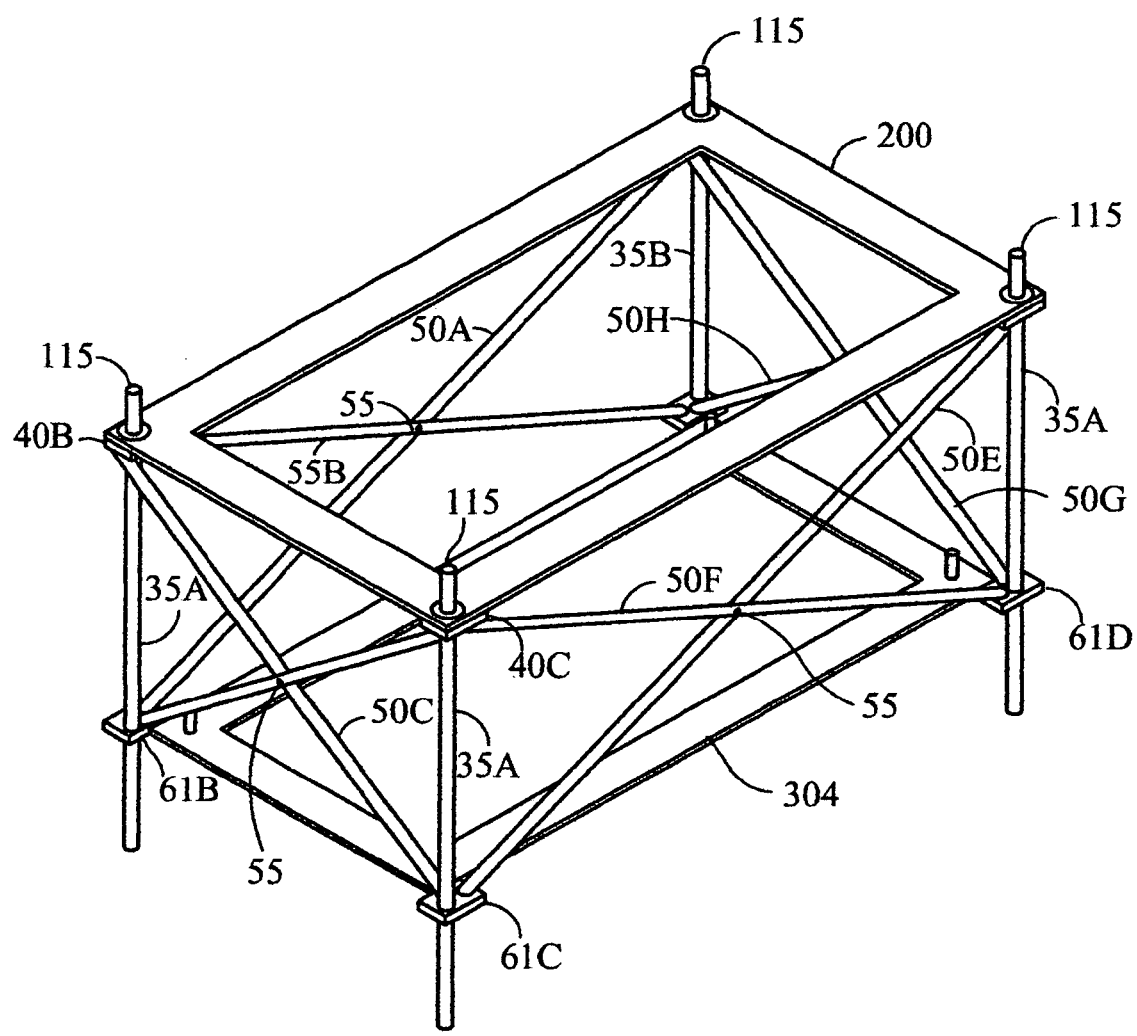
FIG. 29 illustrates a collapsible structure sitting on leg extensions from the lower corner brackets and a rigid SLE attached to the lower corner brackets.

Although we have not discussed it during our presentation of crib frames, it is possible to attach or extend telescoping legs from the lower corner brackets 61 such that the crib sleeping area will be raised above the ground. As illustrated in FIG. 29, a rigid SLE 304 is attached to lower corner brackets 61A, 61B, 61C, and 61D to provide a surface upon which a mattress could be placed for sleeping. Telescoping anti-torque posts 35 are extended below the lower corner brackets 61 and are held in place by a locking mechanism like that illustrated in FIG. 6.

A preferred embodiment is to place the collapsible crib upon a juvenile or adult bed and thus take advantage of an existing sleeping space and mattress. To achieve this end we introduce an embodiment that makes this possible—the anti-tip straps. Small babies and children who do not crawl or walk are often left on beds in bassinets or similar type portable beds to rest as there is little risk or fear of the child tipping the portable bed by rolling over. However, as the child grows and gains the ability to stand and apply weight to the upper edges of a portable bed, the potential exists for the child to topple the portable bed and fall onto the floor increases dramatically. Thus, children with the ability to stand and walk are not placed in portable beds resting on juvenile or adult beds.

Figure 30:
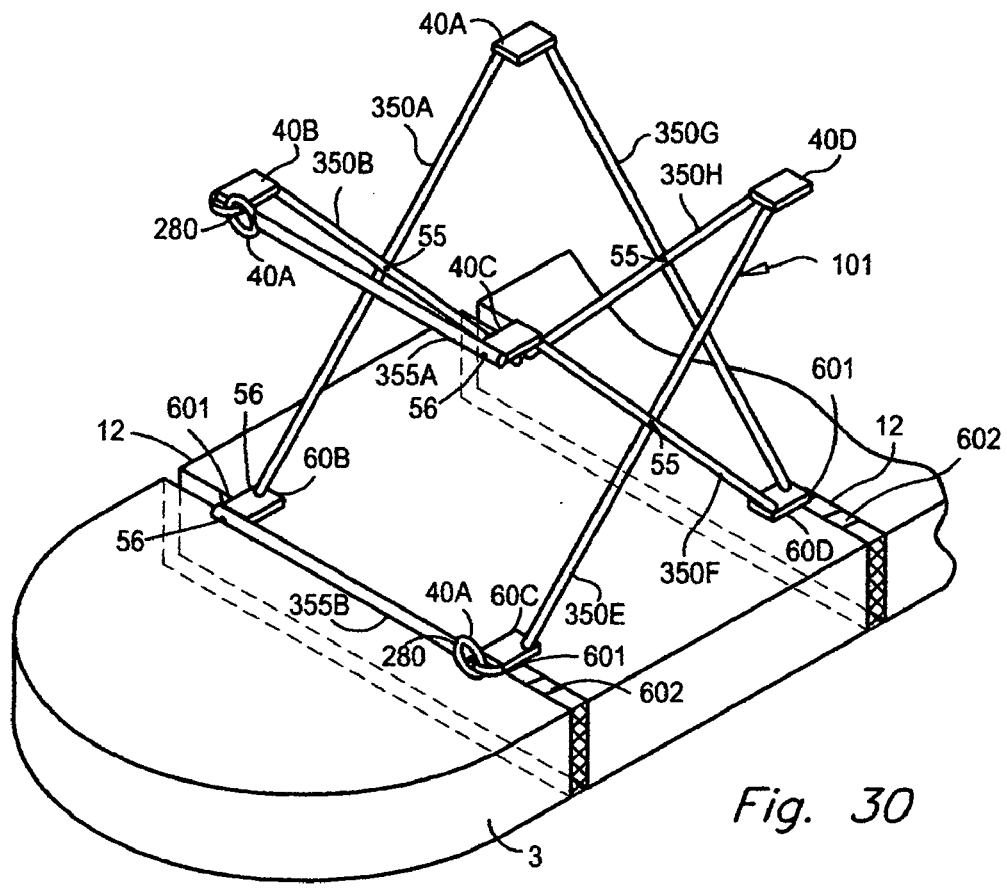
FIG. 30 illustrates a Tie Down Assembly to prevent tipping of a collapsible structure.

FIG. 30 illustrates a Tie Down Assembly (anti-tip and anti-skid straps) that can be incorporated into the lower or upper corner brackets of collapsible beds that eliminates the potential for children who can stand and walk from tipping a collapsible crib. In FIG. 30, a collapsible crib frame 100 is placed upon a mattress 3. A Tie Down Assembly 12 consists of detachable straps 600 that attach to each other or to the bed mattress 3 or frame and to the lower corner brackets 60. FIG. 30 illustrates one end of detachable anti-tip straps 600A, 600B, 600C, and 600D attached with clips 601 onto each lower corner brackets 60A, 60B, 60C and 60D respectively. The anti-tip straps 600A and 600B are placed underneath the mattress 3 and are connected to a buckle 602 on 600D and 600C respectively. The straps 600 are then tightened to lock the collapsible crib frame to the mattress 3 thus preventing it from tipping or skidding should a child's weight be applied to in a manner that might otherwise cause the crib to Up or skid.

Once the concept of securing the collapsible frame to a juvenile or adult bed is recognized, one skilled in the art can derive many means of accomplishing the task of anchoring a collapsible crib frame to a bed. For example, to avoid having to go under the mattress 3 one might use a U shaped hook attached to a strap to hook onto the side of a mattress and then secure the strap to a corner bracket with a cinch buckle.

Figure 31:
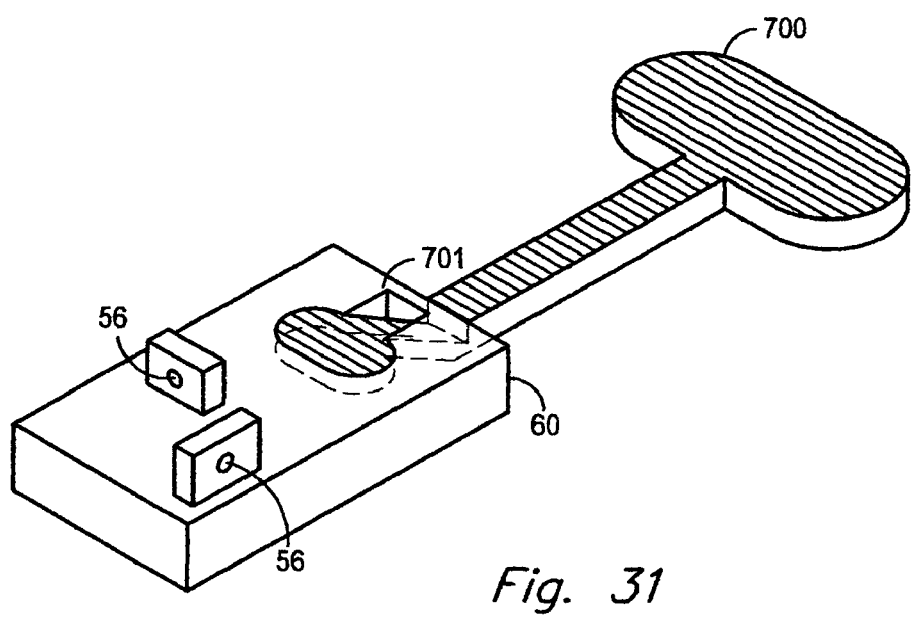
FIG. 31 illustrates an Anti-Tipping Assembly incorporated into a corner bracket design.

Alternatively, if the collapsible crib is to be used as a playpen on the ground, there will be no mattress to anchor the frame to in order to avoid tipping. FIG. 31 illustrates an Anti-Tipping Assembly that can be used with and without ground anchors. The Anti-Tipping Assembly consists of a lower corner bracket 60 that has pivotal connection points 56 for support arms such as crossed support arms, telescoping crossed support arms or telescoping horizontal support bar assemblies. The corner bracket 60 also has a cut out area 701 into which an anti-tip extension bar 700 fits. The cut out area on the lower corner bracket 60 is design such that the anti-tip extension bar 700 provides a resistance force to any pressure applied to the frame in the direction of the anti-tip extension bar 700 and thus keeps the collapsible structure from tipping over. The lower corner bracket 60 is also designed to allow the anti-tip extension bar 700 to be removed from the corner bracket by moving the extended end of the anti-tip extension bar 700 downward to a perpendicular angle to the bottom of the corner bracket 60, rotating the bar 90 degrees and dropping it out the bottom of the corner bracket 60. Thus the crib can be collapsed to a very small size when the anti-tip extension bar 700 is removed when the frame is collapsed, yet provide stability when the frame is open and the anti-tip bar is installed.

When the anti-tip extension bar 700 is to be used for other collapsible structures such as protective sheds for building products, an additional ground spike modification is added to keep the collapsible structure from being lifted by the wind.

Figure 32:
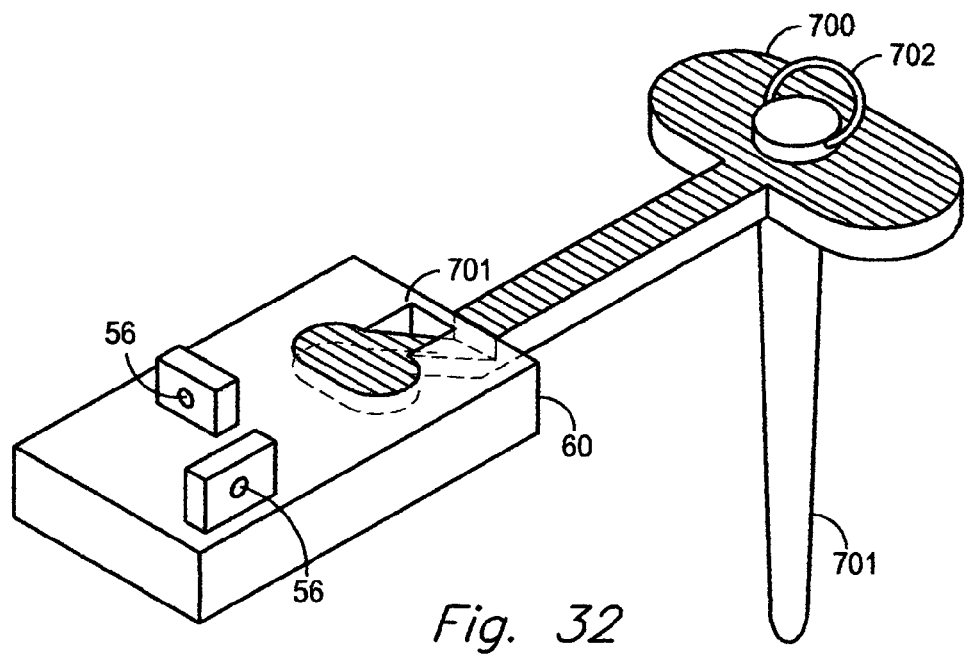
FIG. 32 illustrates an Anti-Tipping Assembly incorporated into a corner bracket with provision for a ground spike.

FIG. 32 illustrates the addition of a spike 701 that is inserted into the ground through a hole in the anti-tip extension bar 700. For easy of removing the spike 701 from the ground when it is desire to collapse the structure, a ring 702 has been added to the head of the spike 700.

Figure 33:
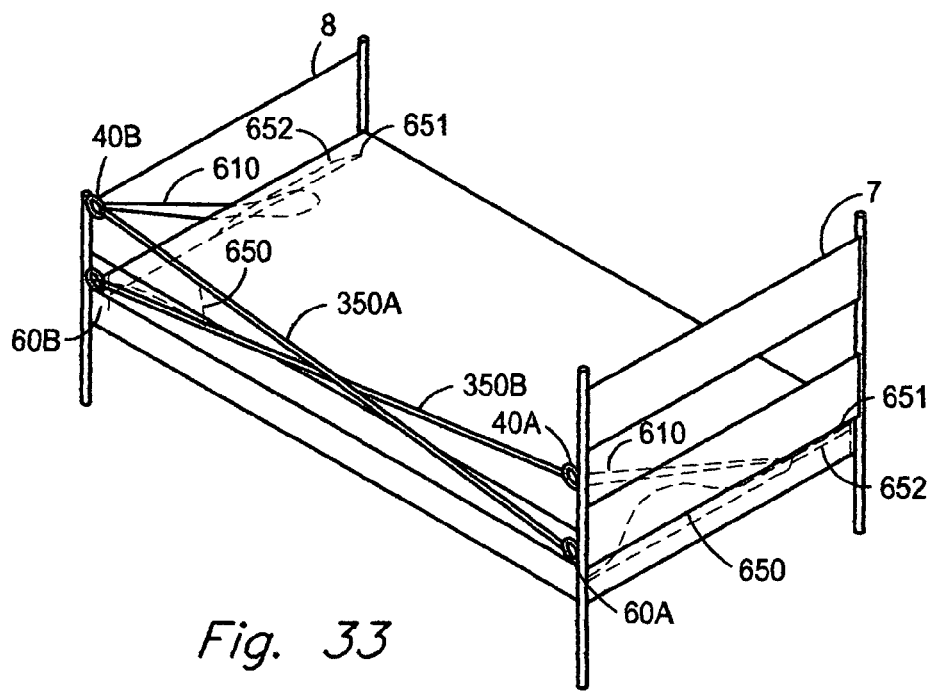
FIG. 33 illustrates a collapsible set of bed rails.

To this point, the specification has been directed to collapsible structures having four sides a top and a bottom. Another embodiment of the invention relates to rails for a child's bed. The principle of telescoping crossed support arms 350 also applies to this application. An example of this is when bed rails are desired for one side of a bed having a headboard 7 and a footboard 8 that sits against a wall and requires only a bed rail for one side only. FIG. 33 illustrates one design for a single collapsible side constructed using telescoping crossed support arms 350. In this design the telescoping crossed support arms 350A and 350B are attached to lower corner brackets 60A and 60B that have a hinged horizontal protrusions 650 that slip under the mattress. An anti-tip/anti-slip strap 662 extends from the horizontal protrusion to a mattress hook 651 that attaches to the opposite side of the mattress from the telescoping crossed support arms 350. A second set of straps 610 extends from the horizontal protrusions 650 to the upper corner brackets 40A and 40B to keep the side from being forced outward if weight is applied by a child. The telescoping crossed support arms 350A and 350B are held in place by an SLE made of a nylon mesh sidewall with a web edging that connects to the upper corner brackets 40A and 40B and the lower corner brackets 60A and 60B. The bed rails are raised and lowered by shortening and lengthening telescoping crossed support arms 350A and 350B which collapse and open the structure.

Referring now to box structures in general and specifically to crates and animal crates. From the previous disclosures in this specification it can be seen by one skilled in the art that by using any number of combinations of crossed support arms 50, telescoping crossed support arms 350, detachable telescoping horizontal is support bar assemblies 355, telescoping anti-torque posts 35, and vertical posts 30 a wide variety of variable size collapsible frames that collapse simultaneously in the X and Y directions can be created.

A preferred embodiment for an animal crate is to use an SLE like 201 in FIG. 9 with a collapsible frame like FIG. 28. Nylon mesh sidewalls and a top are attached to SLE 201 and a flexible water retardant polyvinyl chloride coated polyester fabric bottom is attached to the sidewalls. An Anti-Collapse Locking Element is incorporated by attaching the sidewalls to the lower corner brackets 60. Anti-tip extension bars 700 are included to add stability when the crate is used to transport animals such as in the back of station wagons or SUVs. A zipper opening is provided on the right side of the crate under the detachable telescoping support bar 355A.

In yet another preferred embodiment, a wheeled a collapsible wheeled animal cart or crate is based on a modification of the cart described in FIG. 13. Modifications include replacement of crossed support arms 50E and 50F with detachable horizontal support bar assemblies and replacement of crossed support arms 50C and 50D and 50G and 50H with telescoping cross support arms 350C and 350D and 350G and 350H. Nylon mesh sidewalls and a top are attached to SLE 200 and a flexible water retardant polyvinyl chloride coated polyester fabric bottom is attached to the sidewalls. The bottom flexible bottom rests on the lower SLE 304. A zipper opening is provided on the front side of the crate under the detachable horizontal support bar.

The collapsible wheeled animal cart described in this preferred embodiment is adjustable in length from front to back because of the telescoping cross support arms 350C and 350D and 350G and 350H. The detachable horizontal support bar assemblies are fixed in length and do not telescope. When the crate is closed the horizontal support bar assemblies are disconnected and rotated 90 degrees so that they are in line with the rest of the vertical posts and crossed support arms.

We will not attempt to enumerate all of the different combinations of collapsible wheeled structures that one skilled in the art might construct based on various combinations of crossed support arms, telescoping crossed support arms, detachable horizontal support bar assemblies, detachable telescoping horizontal support bar assemblies and anti-torque posts, however, these would be readily apparent to one skilled in the art given the disclosure of the embodiments enumerated in this specification.

Figure 34:
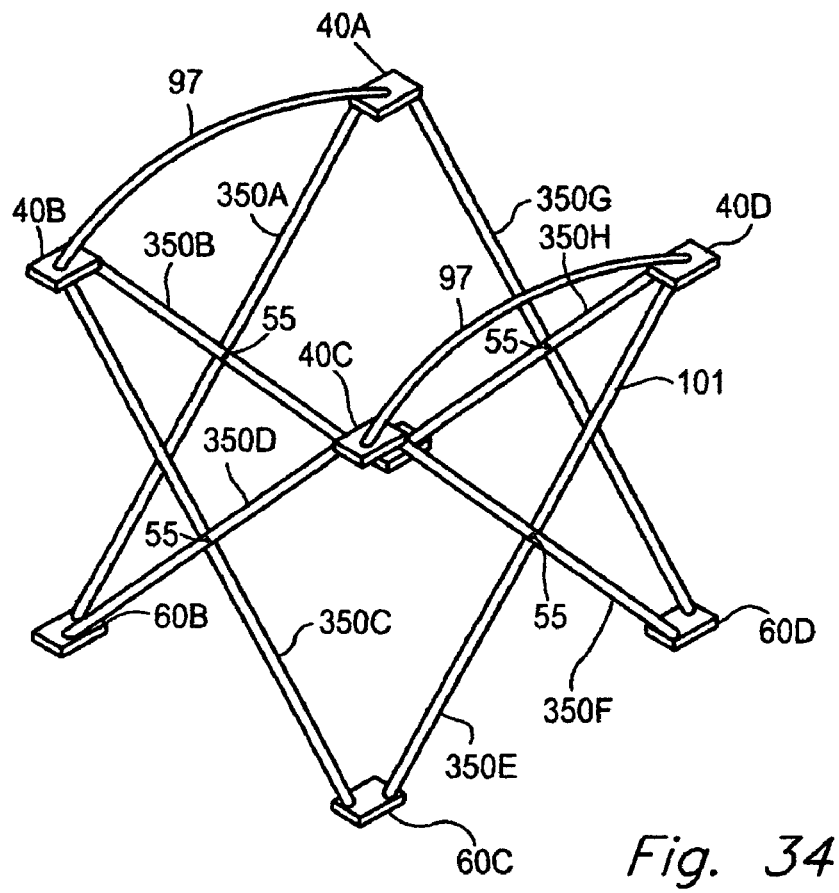
FIG. 34 illustrates removable arches attached to upper corner brackets to provide for water run off.

Referring now to other applications for collapsible structures such as sheds, play houses, pallet covers, etc. In addition to the previously enumerate embodiments apply to these types of structures we add the concept of removable rafters or arches that are attached to upper corner brackets to create and arched, peaked, or domed support structure for a collapsible structure. The removable arched, peaked or domed structure can be used to support a flexible waterproof covering that can be attached from or over the structure to prevent the accumulation of water on the top of the collapsible structure. FIG. 34 is an illustration of two bendable plastic strips 97 that have been turned into flexible arches. The plastic strips 97 have been inserted into retaining pockets in the upper corner brackets 40 of a collapsible structure.

Alternatively, telescoping posts or vertical post extensions above the upper corner brackets 40 can be used to form peaks by inserting rubber connectors into the posts such that opposite sides can be easily bent together to form a peak when the opposite side upper ends are attached.

Figure 35:
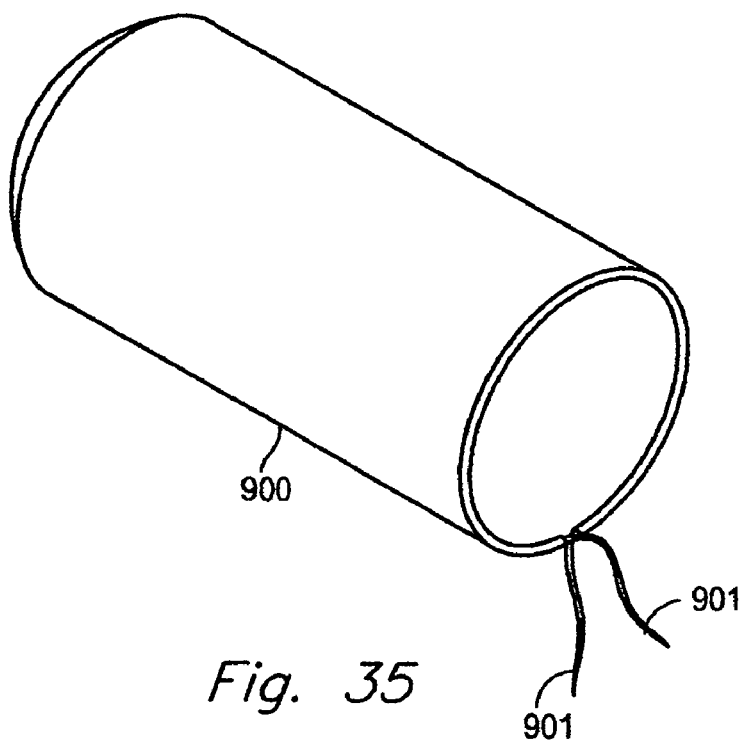
FIG. 35 illustrates a bag with drawstrings for storage and transport of collapsible structures.

All of the collapsible structures can be placed in a fabric bag for storage or transport. FIG. 35 illustrates a fabric bag 900 with drawstrings 901 at the mouth of the bag for closure after a collapsible device has been placed in the bag 900.

For purposes of this specification, a corner bracket is considered to be any device which holds one or more support arms together or holds a SLE to the outer end of a crossed support arm, a telescoping crossed support arm, or a telescoping horizontal support bar.

Throughout this specification we have described telescoping crossed support arms 350 as being comprised of intermediate sections 351 and outer sections 352. This was done for convenience in describing the embodiments. It should be understood that any telescoping element can consist of a number of intermediate sections and outer sections and that what is an outer section to a centered intermediate section may also be an intermediate section to a further outer section. Thus, any description of telescoping arm elements should be considered to assume that the arm can have at least three or more sections.

Throughout this specification we have depicted the corner bracket in illustrations as a solid piece to which the crossed support arms are pivotally attached such as illustrated with corner bracket 61B in FIG. 14. The corner brackets may, however, also be made of flexible materials such as a shock cording material which will permit the support members to pivot from an open to closed position and vice versa.

In the specification we talk about bisecting crossed support arms and bisecting telescoping crossed support arms. It is our intent that the length being divided in half is the distance between the upper and lower corner brackets on each arm. Moreover, it is also our intent that when support arms are considered to be the same length, that the length is measured between the upper and lower corner brackets.

In the specification we refer to intermediate telescoping sections 351 and outer telescoping sections 352 in relation to the center point of the arm with respect to the other sections and not to whether a section slides inside or outside of another tubular section. Although the examples have been illustrated with the intermediate section being the smaller diameter tube over which the outer tube sides the converse is also possible.

Inner and outer tubular sections of telescoping bar assemblies 355 are also reversible and the telescoping bars may consist of more than two telescoping sections.

The invention claimed is:

1. A collapsible crib for a small child comprising:
   a. a frame collapsible simultaneously in two directions comprising:
      i. four sides comprised of two crossed support arms pivotally attached to upper and lower corner brackets,
      ii. said corner brackets also attached to adjacent crossed support arms,
      iii. each of said crossed support arms pivotally connected where they intersect each other and being about the same length as all other crossed support arms,
      iv. said sides being mounted perpendicularly to each other so as to form a box structure that defines an interior cavity surrounded by the four sides,
   b. said crib further comprising a Structure Locking Element, said Structure Locking Element circumscribing the interior in a continuous manner and attached to at least one of: all upper corner brackets, all lower corner brackets,
   c. said crib further comprising a liner,
      i. said liner comprised of a continuous side wall panel made of a flexible material and a bottom panel made of a flexible material,
      ii. the perimeter of said liner side wall panel being approximately the same length as the Structure Locking Element perimeter,
      iii. said bottom panel attached contiguously to the lower edge of the side wall panel extending around the collapsible crib's interior,
      iv. the upper edge of said liner side wall panel attached to at least one of: all corner brackets, the Structure Locking Element,
   d. said crib further including at least two Anti-Collapse Mechanisms to prevent the collapsing of the crib comprising:
      i. said Anti-Collapse Mechanisms attached to at least two opposing frame corners,
      ii. said Anti-Collapse Mechanism comprised of a non-expanding flexible material detachably connected vertically between a lower corner bracket and its corresponding upper corner bracket.

2. A crib as recited in claims 1 wherein the liner, the Structure Locking Element and the Anti-Collapse Mechanisms are incorporated into a single assembly.

3. A crib as recited in claim 1, wherein at least one corner bracket contains an anti-tipping mechanism.

4. A crib as recited in claim 1, wherein at least two adjacent corners contain telescoping anti-torque posts.

5. A crib as recited in claim 4, wherein caster wheels are mounted on the underside of corner brackets containing telescoping anti-torque posts.

6. A crib as recited in claim 1, wherein at least two pairs of opposite side crossed support arms are adjustable in length to allow the four ends of each pair of length adjustable cross support arms to extend and retract to a similar length.

7. A portable crib collapsible simultaneously in at least two directions for a small child or animal comprising:
   a. a collapsible crib frame having at least three sides comprising:
      i. one pair of crossed support arms per side pivotally connected and being substantially equal length to all other crossed support arm pairs when the crib is in its collapsed position,
      ii. one end of each crossed arm support is pivotally attached to an upper corner bracket and its opposite end is pivotally attached to a lower corner bracket,
      iii. the number of upper corner brackets is equal to the number of sides and the number of lower corner brackets is equal to the number of sides and, iv. said corner brackets are oriented such that each corner bracket is attached to crossed support arms from adjacent sides, thus forming an open topped enclosure,
b. a Structure Locking Element connecting at least one of: all upper corner brackets, all lower corner brackets comprising: a non-expanding, flexible material used to connect each bracket to its adjacent corner brackets thus connecting and locking in place the perimeter of the collapsible frame,
c. an Anti-Collapse Mechanism and means to easily attach and detach said Anti-Collapse Mechanism from at least one of: the crib's upper corner brackets, the crib's lower corner brackets during assembly and disassembly of the crib comprising; a non-expanding, flexible material used to connect at least one lower corner bracket to its vertically aligned upper corner bracket, and,
d. a liner comprising, a continuous flexible side wall extending around the collapsible crib's interior perimeter.

8. A crib as recited in claim 7, wherein at least one pair of crossed support arms are adjustable in length to allow the ends of each pair of length adjustable cross support arms to extend and retract.

9. The collapsible crib as recited in claims 7, further including at least two telescoping anti-torque posts each extending between a lower corner bracket and its vertically aligned upper corner bracket.

10. The collapsible crib as recited in claims 7, further including caster wheels mounted on the bottom side of lower corner brackets with telescoping anti-torque posts attached.

\* \* \* \* \*